United States Patent
Helvik et al.

(10) Patent No.: US 10,757,201 B2
(45) Date of Patent: Aug. 25, 2020

(54) DOCUMENT AND CONTENT FEED

(71) Applicant: MICROSOFT TECHNOLOGY LICENSING, LLC, Redmond, WA (US)

(72) Inventors: Torbjørn Helvik, Oslo (NO); Johan Idivuoma, Tromsø (NO); Vidar Vikjord, Tromsø (NO); Joshua Stickler, Oslo (NO); Bjørnstein Lilleby, Tromsø (NO)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/194,700

(22) Filed: Mar. 1, 2014

(65) Prior Publication Data

US 2015/0249715 A1   Sep. 3, 2015

(51) Int. Cl.
*G06F 15/16* (2006.01)
*H04L 29/08* (2006.01)
(Continued)

(52) U.S. Cl.
CPC ........ *H04L 67/22* (2013.01); *G06F 16/24578* (2019.01); *G06Q 10/10* (2013.01)

(58) Field of Classification Search
CPC .................................................... H04L 67/306
(Continued)

(56) References Cited

U.S. PATENT DOCUMENTS 6,434,556 B1   8/2002 Levin et al.
6,745,195 B1   6/2004 Kornfein et al.
(Continued)

FOREIGN PATENT DOCUMENTS

CN       1666279 A     9/2005
CN     101398836 A     4/2009
(Continued)

OTHER PUBLICATIONS

Soussi, Rania, "Querying and Extracting Heterogeneous Graphs from Structured Data and Unstrutured Content", In Doctoral Dissertation, Ecole Centrale Paris, Jun. 22, 2012, 208 pages (1 page Abstract).

(Continued)

*Primary Examiner* — Kevin T Bates
*Assistant Examiner* — Clarence D McCray
(74) *Attorney, Agent, or Firm* — Merchant & Gould

(57) ABSTRACT

An information feed is provided that surfaces information items that are determined to be interesting or relevant to a user. The information feed may be updated with new information items each time the feed is accessed by the user. Information not surfaced to the user in the feed may be accessed by the user via one or more other means, but only those items having a sufficient importance to the user are surfaced in the feed. Items in the feed are sorted by order of importance or relevance to the user. When new items are added to the feed, they are sorted relative to each other, but are displayed separately from previous groupings of items added to the feed. Items may be reposted to different positions in the feed, and items may be manually removed from the feed if desired.

20 Claims, 11 Drawing Sheets

(51) Int. Cl.
    *G06F 16/2457*     (2019.01)
    *G06Q 10/10*     (2012.01)

(58) Field of Classification Search
    USPC .................................................. 709/204
    See application file for complete search history.

(56) References Cited

U.S. PATENT DOCUMENTS

| | | | |
|---|---|---|---|
| 7,031,961 B2 | 4/2006 | Pitkow et al. | |
| 7,055,168 B1 | 5/2006 | Errico et al. | |
| 7,444,344 B2 | 10/2008 | Galindo-Legaria et al. | |
| 7,509,320 B2 | 3/2009 | Hess | |
| 7,571,121 B2 * | 8/2009 | Bezos | G06F 17/30867 705/14.53 |
| 7,577,718 B2 | 8/2009 | Slawson et al. | |
| 7,587,101 B1 | 9/2009 | Bourdev | |
| 7,640,236 B1 | 12/2009 | Pogue | |
| 7,756,945 B1 | 7/2010 | Andreessen et al. | |
| 7,761,447 B2 * | 7/2010 | Brill | G06F 17/30675 707/723 |
| 7,783,630 B1 | 8/2010 | Chevalier et al. | |
| 7,788,245 B1 | 8/2010 | Eddings | |
| 7,873,641 B2 | 1/2011 | Frieden et al. | |
| 7,890,501 B2 | 2/2011 | Lunt et al. | |
| 7,945,571 B2 | 5/2011 | Wanker | |
| 7,958,116 B2 | 6/2011 | House et al. | |
| 7,962,481 B2 | 6/2011 | Ganesh et al. | |
| 8,005,817 B1 | 8/2011 | Amer-Yahia et al. | |
| 8,060,513 B2 | 11/2011 | Basco et al. | |
| 8,065,383 B2 | 11/2011 | Carlson et al. | |
| 8,117,197 B1 * | 2/2012 | Cramer | G06Q 30/0256 707/731 |
| 8,204,870 B2 | 6/2012 | Mukkamala et al. | |
| 8,204,888 B2 | 6/2012 | Frieden et al. | |
| 8,209,349 B2 | 6/2012 | Howes et al. | |
| 8,214,325 B2 | 7/2012 | Navas | |
| 8,266,144 B2 | 9/2012 | Tankovich et al. | |
| 8,301,764 B2 | 10/2012 | Konig et al. | |
| 8,312,056 B1 | 11/2012 | Peng et al. | |
| 8,341,017 B2 | 12/2012 | Payne et al. | |
| 8,341,150 B2 | 12/2012 | Riley et al. | |
| 8,346,765 B2 | 1/2013 | Guo et al. | |
| 8,346,950 B1 | 1/2013 | Andreessen et al. | |
| 8,380,562 B2 | 2/2013 | Toebes et al. | |
| 8,386,515 B2 | 2/2013 | Bent et al. | |
| 8,463,795 B2 | 6/2013 | Van Hoff | |
| 8,538,959 B2 | 9/2013 | Jin et al. | |
| 8,548,996 B2 | 10/2013 | Tareen et al. | |
| 8,572,477 B1 | 10/2013 | Moskovitz et al. | |
| 8,600,981 B1 | 12/2013 | Chau et al. | |
| 8,601,023 B2 | 12/2013 | Brave et al. | |
| 8,751,621 B2 | 6/2014 | Vaynblat et al. | |
| 8,751,636 B2 | 6/2014 | Tseng et al. | |
| 8,775,334 B1 | 7/2014 | Lloyd et al. | |
| 8,782,036 B1 | 7/2014 | Chen et al. | |
| 8,799,296 B2 | 8/2014 | Agapiev | |
| 8,812,947 B1 | 8/2014 | Maoz et al. | |
| 8,825,649 B2 | 9/2014 | Eimendinger et al. | |
| 8,825,711 B2 | 9/2014 | Chan et al. | |
| 8,874,550 B1 | 10/2014 | Soubramanien et al. | |
| 8,886,633 B2 | 11/2014 | Smyth et al. | |
| 8,898,156 B2 | 11/2014 | Xu et al. | |
| 8,909,515 B2 | 12/2014 | O'Neil et al. | |
| 8,984,098 B1 * | 3/2015 | Tomkins | G06F 17/30041 709/219 |
| 8,996,631 B1 | 3/2015 | Staddon et al. | |
| 9,165,305 B1 | 10/2015 | Chandra et al. | |
| 9,177,293 B1 | 11/2015 | Gagnon | |
| 9,195,679 B1 | 11/2015 | Svendsen | |
| 9,223,866 B2 | 12/2015 | Marcucci et al. | |
| 9,438,619 B1 | 9/2016 | Chan et al. | |
| 9,514,191 B2 | 12/2016 | Solheim et al. | |
| 9,542,440 B2 | 1/2017 | Wang et al. | |
| 9,576,007 B1 | 2/2017 | Sivathanu | |
| 2001/0034859 A1 | 10/2001 | Swoboda et al. | |
| 2002/0038299 A1 | 3/2002 | Zernik et al. | |
| 2002/0091736 A1 | 7/2002 | Wall | |
| 2002/0169759 A1 | 11/2002 | Kraft et al. | |
| 2003/0025692 A1 | 2/2003 | Lu et al. | |
| 2003/0071814 A1 | 4/2003 | Jou et al. | |
| 2003/0115271 A1 | 6/2003 | Weissman | |
| 2004/0255237 A1 | 12/2004 | Tong | |
| 2004/0267736 A1 | 12/2004 | Yamane et al. | |
| 2005/0076240 A1 | 4/2005 | Appelman | |
| 2005/0076241 A1 | 4/2005 | Appelman | |
| 2005/0201535 A1 | 9/2005 | LaLonde | |
| 2005/0203929 A1 | 9/2005 | Hazarika | |
| 2005/0246420 A1 | 11/2005 | Little | |
| 2005/0278321 A1 | 12/2005 | Vailaya et al. | |
| 2005/0278325 A1 | 12/2005 | Mihalcea et al. | |
| 2006/0004892 A1 | 1/2006 | Lunt et al. | |
| 2006/0074883 A1 | 4/2006 | Teevan et al. | |
| 2006/0123014 A1 | 6/2006 | Ng | |
| 2006/0168036 A1 | 7/2006 | Schultz | |
| 2006/0294085 A1 | 12/2006 | Rose et al. | |
| 2007/0162443 A1 | 7/2007 | Liu et al. | |
| 2007/0192306 A1 | 8/2007 | Papakonstantinou et al. | |
| 2007/0208751 A1 | 9/2007 | Cowan et al. | |
| 2008/0005064 A1 | 1/2008 | Sarukkai | |
| 2008/0010337 A1 * | 1/2008 | Hayes | G06Q 10/00 709/202 |
| 2008/0010350 A1 | 1/2008 | Chen et al. | |
| 2008/0016053 A1 | 1/2008 | Frieden et al. | |
| 2008/0086344 A1 | 4/2008 | Martini et al. | |
| 2008/0097968 A1 | 4/2008 | Delgado et al. | |
| 2009/0049053 A1 | 2/2009 | Barker et al. | |
| 2009/0094233 A1 | 4/2009 | Marvit et al. | |
| 2009/0125560 A1 | 5/2009 | Munekuni et al. | |
| 2009/0132490 A1 | 5/2009 | Okraglik | |
| 2009/0132516 A1 | 5/2009 | Patel et al. | |
| 2009/0150866 A1 | 6/2009 | Schmidt | |
| 2009/0182727 A1 | 7/2009 | Majko | |
| 2009/0256678 A1 | 10/2009 | Ryu | |
| 2009/0313295 A1 | 12/2009 | Blaxland et al. | |
| 2009/0327271 A1 | 12/2009 | Amitay et al. | |
| 2010/0063878 A1 | 3/2010 | Bachet et al. | |
| 2010/0082695 A1 | 4/2010 | Hardt | |
| 2010/0083151 A1 | 4/2010 | Lanza et al. | |
| 2010/0169320 A1 | 7/2010 | Patnam et al. | |
| 2010/0169326 A1 | 7/2010 | Ma et al. | |
| 2010/0179874 A1 | 7/2010 | Higgins et al. | |
| 2010/0185610 A1 | 7/2010 | Lunt et al. | |
| 2010/0223266 A1 | 9/2010 | Balmin et al. | |
| 2010/0268703 A1 | 10/2010 | Buck | |
| 2010/0306185 A1 | 12/2010 | Smith | |
| 2010/0332330 A1 | 12/2010 | Goel et al. | |
| 2011/0004831 A1 | 1/2011 | Steinberg et al. | |
| 2011/0040617 A1 | 2/2011 | Moonka et al. | |
| 2011/0055241 A1 | 3/2011 | Lewis | |
| 2011/0060803 A1 | 3/2011 | Barlin et al. | |
| 2011/0087644 A1 | 4/2011 | Frieden et al. | |
| 2011/0145275 A1 | 6/2011 | Stewart | |
| 2011/0145719 A1 | 6/2011 | Chen et al. | |
| 2011/0214046 A1 | 9/2011 | Haberman et al. | |
| 2011/0218946 A1 | 9/2011 | Stern et al. | |
| 2011/0231381 A1 | 9/2011 | Mercuri | |
| 2011/0264737 A1 | 10/2011 | Skinner | |
| 2011/0271224 A1 | 11/2011 | Cruz Moreno et al. | |
| 2012/0030169 A1 | 2/2012 | Allen et al. | |
| 2012/0047114 A1 | 2/2012 | Duan et al. | |
| 2012/0054303 A1 | 3/2012 | Priyadarshan et al. | |
| 2012/0076367 A1 | 3/2012 | Tseng | |
| 2012/0078896 A1 | 3/2012 | Nixon et al. | |
| 2012/0079004 A1 * | 3/2012 | Herman | H04L 67/26 709/203 |
| 2012/0084291 A1 | 4/2012 | Chung | |
| 2012/0124041 A1 | 5/2012 | Bawri et al. | |
| 2012/0158720 A1 | 6/2012 | Luan et al. | |
| 2012/0158791 A1 | 6/2012 | Kasneci et al. | |
| 2012/0209859 A1 | 8/2012 | Blount | |
| 2012/0209878 A1 | 8/2012 | Park et al. | |
| 2012/0210240 A1 | 8/2012 | Neystadt et al. | |
| 2012/0215771 A1 | 8/2012 | Steiner | |

(56) References Cited

U.S. PATENT DOCUMENTS

| | | |
|---|---|---|
| 2012/0215773 A1 | 8/2012 | Si et al. |
| 2012/0221558 A1 | 8/2012 | Byrne et al. |
| 2012/0221566 A1 | 8/2012 | Iwasa et al. |
| 2012/0239618 A1 | 9/2012 | Kung |
| 2012/0254790 A1 | 10/2012 | Colombino et al. |
| 2012/0271807 A1 | 10/2012 | Smyth et al. |
| 2012/0290399 A1 | 11/2012 | England et al. |
| 2012/0290637 A1 | 11/2012 | Perantatos et al. |
| 2012/0296918 A1 | 11/2012 | Morris et al. |
| 2012/0304215 A1 | 11/2012 | McCarthy et al. |
| 2012/0310922 A1 | 12/2012 | Johnson et al. |
| 2012/0311139 A1* | 12/2012 | Brave .............. G06F 17/30867 709/224 |
| 2012/0323998 A1 | 12/2012 | Schoen et al. |
| 2012/0324002 A1 | 12/2012 | Chen |
| 2012/0324027 A1 | 12/2012 | Vaynblat et al. |
| 2012/0330908 A1 | 12/2012 | Stowe et al. |
| 2012/0330992 A1 | 12/2012 | Kanigsberg et al. |
| 2013/0006754 A1 | 1/2013 | Horvitz et al. |
| 2013/0013678 A1 | 1/2013 | Murthy |
| 2013/0031489 A1 | 1/2013 | Gubin et al. |
| 2013/0036230 A1 | 2/2013 | Bakos |
| 2013/0041896 A1 | 2/2013 | Ghani et al. |
| 2013/0054349 A1 | 2/2013 | Ogawa |
| 2013/0073280 A1 | 3/2013 | O'Neil et al. |
| 2013/0073568 A1 | 3/2013 | Federov et al. |
| 2013/0073632 A1 | 3/2013 | Fedorov et al. |
| 2013/0073979 A1 | 3/2013 | Shepherd et al. |
| 2013/0073983 A1 | 3/2013 | Rasmussen et al. |
| 2013/0080218 A1* | 3/2013 | Wildern, IV ...... G06F 17/30879 705/14.1 |
| 2013/0086057 A1 | 4/2013 | Harrington et al. |
| 2013/0091149 A1 | 4/2013 | Dunn et al. |
| 2013/0097143 A1 | 4/2013 | Shenoy et al. |
| 2013/0097184 A1 | 4/2013 | Berkhin et al. |
| 2013/0103683 A1 | 4/2013 | Haveliwala et al. |
| 2013/0110638 A1 | 5/2013 | Ogawa |
| 2013/0110802 A1 | 5/2013 | Shenoy et al. |
| 2013/0110827 A1 | 5/2013 | Nabar et al. |
| 2013/0110978 A1 | 5/2013 | Gordon et al. |
| 2013/0124437 A1 | 5/2013 | Pennacchiotti et al. |
| 2013/0124613 A1 | 5/2013 | Plache et al. |
| 2013/0132138 A1 | 5/2013 | Doganata et al. |
| 2013/0151611 A1 | 6/2013 | Graham et al. |
| 2013/0155068 A1 | 6/2013 | Bier et al. |
| 2013/0159096 A1* | 6/2013 | Santhanagopal ...... G06Q 50/01 705/14.49 |
| 2013/0167059 A1 | 6/2013 | Legris |
| 2013/0191416 A1 | 7/2013 | Lee et al. |
| 2013/0204706 A1 | 8/2013 | Tang et al. |
| 2013/0212081 A1 | 8/2013 | Shenoy et al. |
| 2013/0218885 A1 | 8/2013 | Satyanarayanan |
| 2013/0218899 A1 | 8/2013 | Raghavan et al. |
| 2013/0227011 A1 | 8/2013 | Sharma et al. |
| 2013/0238449 A1 | 9/2013 | Ferreira et al. |
| 2013/0238587 A1 | 9/2013 | Annau et al. |
| 2013/0238588 A1 | 9/2013 | Annau et al. |
| 2013/0246404 A1 | 9/2013 | Annau et al. |
| 2013/0246405 A1 | 9/2013 | Annau et al. |
| 2013/0246521 A1* | 9/2013 | Schacht .............. H04L 67/1095 709/204 |
| 2013/0262588 A1 | 10/2013 | Barak et al. |
| 2013/0268973 A1 | 10/2013 | Archibong et al. |
| 2013/0288715 A1* | 10/2013 | Shieh .................... H04W 4/043 455/456.3 |
| 2013/0290323 A1 | 10/2013 | Saib |
| 2013/0298084 A1 | 11/2013 | Spivack et al. |
| 2013/0326369 A1 | 12/2013 | Buchanon |
| 2013/0332523 A1* | 12/2013 | Luu ................... G06F 16/9535 709/204 |
| 2013/0346329 A1 | 12/2013 | Alib-Bulatao et al. |
| 2014/0007860 A1* | 1/2014 | Lu ............................ F24C 1/16 126/19 M |
| 2014/0013353 A1 | 1/2014 | Mathur |
| 2014/0032563 A1 | 1/2014 | Lassen et al. |
| 2014/0040008 A1 | 2/2014 | Belani et al. |
| 2014/0040244 A1 | 2/2014 | Rubinstein et al. |
| 2014/0040246 A1 | 2/2014 | Rubinstein et al. |
| 2014/0040367 A1 | 2/2014 | Lessin et al. |
| 2014/0040370 A1* | 2/2014 | Buhr ..................... H04L 67/306 709/204 |
| 2014/0040729 A1 | 2/2014 | Marlow et al. |
| 2014/0041038 A1 | 2/2014 | Lessin et al. |
| 2014/0046982 A1 | 2/2014 | Chan et al. |
| 2014/0074602 A1 | 3/2014 | van Elsas et al. |
| 2014/0074888 A1 | 3/2014 | Potter et al. |
| 2014/0074934 A1 | 3/2014 | van Hoff et al. |
| 2014/0114986 A1 | 4/2014 | Bierner et al. |
| 2014/0156652 A1 | 6/2014 | Abiola |
| 2014/0164388 A1 | 6/2014 | Zhang |
| 2014/0173459 A1 | 6/2014 | Gaiser et al. |
| 2014/0181083 A1 | 6/2014 | Macho et al. |
| 2014/0181091 A1 | 6/2014 | Lassen et al. |
| 2014/0188899 A1 | 7/2014 | Whitnah et al. |
| 2014/0189530 A1 | 7/2014 | Anand et al. |
| 2014/0195605 A1 | 7/2014 | Kallayil |
| 2014/0207860 A1* | 7/2014 | Wang .................... H04L 65/403 709/204 |
| 2014/0208234 A1 | 7/2014 | Amit et al. |
| 2014/0215351 A1 | 7/2014 | Gansca et al. |
| 2014/0278986 A1 | 9/2014 | Rouse et al. |
| 2014/0280080 A1 | 9/2014 | Solheim et al. |
| 2014/0282029 A1 | 9/2014 | Vishria |
| 2014/0324850 A1 | 10/2014 | Magnaghi et al. |
| 2014/0330551 A1 | 11/2014 | Bao et al. |
| 2014/0330809 A1 | 11/2014 | Raina et al. |
| 2014/0330818 A1 | 11/2014 | Raina et al. |
| 2014/0330819 A1 | 11/2014 | Raina et al. |
| 2014/0337316 A1 | 11/2014 | Abuelsaad et al. |
| 2014/0344288 A1 | 11/2014 | Evans et al. |
| 2014/0359023 A1 | 12/2014 | Homsany |
| 2015/0039596 A1 | 2/2015 | Stewart |
| 2015/0039632 A1 | 2/2015 | Leppanen et al. |
| 2015/0058758 A1 | 2/2015 | Tseng |
| 2015/0067505 A1 | 3/2015 | Metcalf et al. |
| 2015/0081449 A1* | 3/2015 | Ge ..................... G06F 17/30867 705/14.66 |
| 2015/0100644 A1 | 4/2015 | Gulik |
| 2015/0106191 A1 | 4/2015 | Ge et al. |
| 2015/0120700 A1 | 4/2015 | Holm et al. |
| 2015/0127677 A1 | 5/2015 | Wang et al. |
| 2015/0142785 A1 | 5/2015 | Roberts et al. |
| 2015/0187021 A1 | 7/2015 | Karatzoglou et al. |
| 2015/0220531 A1 | 8/2015 | Helvik et al. |
| 2015/0242402 A1 | 8/2015 | Holm et al. |
| 2015/0242473 A1 | 8/2015 | Brugard et al. |
| 2015/0248222 A1 | 9/2015 | Stickler et al. |
| 2015/0248410 A1* | 9/2015 | Stickler ................... H04L 67/02 707/728 |
| 2015/0248480 A1 | 9/2015 | Miller et al. |
| 2015/0294138 A1 | 10/2015 | Barak et al. |
| 2015/0363402 A1 | 12/2015 | Jackson et al. |
| 2015/0363407 A1 | 12/2015 | Huynh et al. |
| 2015/0379586 A1* | 12/2015 | Mooney ............. G06Q 30/0282 705/14.73 |
| 2015/0381552 A1 | 12/2015 | Vijay et al. |
| 2016/0034469 A1* | 2/2016 | Livingston ........ G06F 17/30528 707/706 |
| 2016/0070764 A1 | 3/2016 | Helvik et al. |
| 2016/0117740 A1 | 4/2016 | Linden et al. |
| 2016/0203510 A1 | 7/2016 | Pregueiro et al. |
| 2017/0072002 A1 | 3/2017 | Bafundo et al. |
| 2017/0091644 A1 | 3/2017 | Chung et al. |
| 2019/0180204 A1 | 6/2019 | Stickler et al. |

FOREIGN PATENT DOCUMENTS

| | | |
|---|---|---|
| CN | 102150161 A | 8/2011 |
| CN | 102298612 A | 12/2011 |
| CN | 102567326 A | 7/2012 |
| CN | 102693251 A | 9/2012 |
| CN | 102708168 A | 10/2012 |

(56) References Cited

FOREIGN PATENT DOCUMENTS

| | | | |
|---|---|---|---|
| CN | 102906689 | A | 1/2013 |
| CN | 102930035 | A | 2/2013 |
| EP | 2409271 | A2 | 1/2012 |
| EP | 2426634 | A1 | 3/2012 |
| EP | 2764489 | A1 | 8/2014 |
| WO | 2008097969 | A2 | 8/2008 |
| WO | 2008/111087 | A2 | 9/2008 |
| WO | 2010/029410 | A1 | 3/2010 |
| WO | 2012129400 | A2 | 9/2012 |
| WO | 2013/026095 | A1 | 2/2013 |
| WO | 2013/043654 | A2 | 3/2013 |
| WO | 2013/123550 | A1 | 8/2013 |
| WO | 2013/173232 | A1 | 11/2013 |

OTHER PUBLICATIONS

"Second Written Opinion Issued in PCT Application No. PCT/US2015/017865", dated Dec. 4, 2015, 6 pages.

Li, et al., "Personalized Blog Information Retrieval Personalized Blog Information Retrieval", In IEEE 2nd International Conference on Social Computing, Aug. 20, 2010, 8 pages.

"Bing Ads targeting—training", Published on: Mar. 31, 2013 Available at: http://advertise.bingads.microsoft.com/en-ca/cl/245/training/bing-ads-targeting.

"Campaign Element Template Parameters—Training", Retrieved on: Oct. 1, 2014 Available at: https://www-304.ibm.com/support/knowledgecenter/SSZLC2_7.0.0/com.ibm.commerce.management-center_customization.doc/concepts/csbcustargdef.htm.

"Connections Enterprise Content Edition", Published on: Nov. 22, 2013 Available at: http://www-03.ibm.com/software/products/en/connections-ecm/.

"Enterprise Search from Microsoft", Published on: Jan. 2007, Available at: https://www.google.co.in/url?sa=t&rct=j&q=&esrc=s&source=web&cd=2&cad=rja&ved=0CDMQFjAB&url=http%3A%2F%2Fdownload.microsoft.com%2Fdownload%2Fd%2F0%2F1%2Fd0165e6d-11cb-464b-b24a-c019d82def0d%2FEnterprise%2520Search%2520from%2520Microsoft.doc&ei=IAq9UqueHoTtrAe5yoC4Bg&usg=AFQjCNEax9yYC0KGTUhr4bNIxTJpyyyhsA&bvm=bv.58187178,d.bmk.

"Facets for Enterprise Search Collections", Retrieved on: Jun. 17, 2014, Available at: http://pic.dhe.ibm.com/infocenter/analytic/v3r0m0/index.jsp?topic=%2Fcom.ibm.discovery.es.ad.doc%2Fiiysafacets.htm.

"Getting Started with your My Site", Published on: Apr. 6, 2013, Available at: http://office.microsoft.com/en-in/sharepoint-server-help/getting-started-with-your-my-site-HA101665444.aspx.

"How to Segment and Target Your Emails—Training", Published on: Aug. 15, 2014 Available at: http://www.marketo.com/assets/uploads/How-to-Segment-and-Target-Your-Emails.pdf?20130828153321.

"Introducing Delve (codename Oslo) and the Office Graph", Published on: Mar. 11, 2014, Available at: http://blogs.office.com/2014/03/11/introducing-codename-oslo-and-the-office-graph/.

"Introduction to Managed Metadata", Retrieved on: Jun. 23, 2014 Available at: http://office.microsoft.com/en-001/office365-sharepoint-online-enterprise-help/introduction-to-managed-metadata-HA102832521.aspx.

"Persistent Search: Search's Next Big Battleground", Available at: http://billburnham.blogs.com/burnhamsbeat/2006/04/persistent_sear.html, Published on: Apr. 10, 2006, 3 pages.

"Turn search history off or on", retrieved from http://onlinehelp.microsoft.com/en-US/bing/ff808483.aspx, Retrieved date: Dec. 12, 2013, 1 page.

"Yammer the Enterprise Social Network", Published on: Sep. 9, 2013 Available at: https://about.yammer.com/product/feature-list/.

Amitay et al., "Social Search and Discovery using a Unified Approach", In Proceedings of the 20th ACm Conference on Hypertext and Hypermedia, Jun. 29, 2009, pp. 199-208.

Bailly, Nestor, "Finding the Best Video Content Using the Power of the Social Graph", Published on: Jul. 17, 2013 Available at: http://iq.intel.com/iq/35820000/finding-the-best-video-content-using-the-power-of-the-social-graph.

Bobadilla et al., "Recommender Systems Survey", In Journal of Knowledge-Based Systems, vol. 46, Jul. 2013, pp. 109-132.

Daly et al., "Social Lens: Personalization around user Defined Collections for Filtering Enterprise Message Streams", In Proceedings of the Fifth International AAAI Conference on Weblogs and Social Media, Published on: Jul. 17, 2011, 8 pages.

Diaz et al., "SIGIR 2013 Workshop on Time Aware Information Access (#TAIA2013)", In Proceedings of the 36th International ACM SIGIR Conference on Research and Development in Information Retrieval, Aug. 1, 2013, 41 pages.

Elbassuoni et al., "Language-Model-Based Ranking for Queries on RDF-Graphs", in Proceedings of the 18th ACM Conference on Information and Knowledge Management, Nov. 2, 2009, 10 pages.

Fan et al., "Tuning Before Feedback: Combining Ranking Discovery and Blind Feedback for Robust Retrieval", Retrieved at http://filebox.vt.edu/users/wfan/paper/ARRANGER/p52-Fan.pdf, 27th Annual International ACM SIGIR Conference on Research and Development in Information Retrieval, Jul. 25, 2004, 8 pages.

Fazio, Stephanie, "How Social is Enterprise Search?", Published on: Mar. 14, 2012, Available at: http://blogs.opentext.com/vca/blog/1.11.647/article/1.26.2007/2012/3/14/How_Social_is_Enterprise_Search%3F.

Fox, Vanessa, "Marketing in the Age of Google", John Wiley & Sons, Mar. 8, 2012, 3 pages.

Giugno et al., "GraphGrep: A Fast and Universal Method for Querying Graphs", In Proceedings of the 16th International Conference on Pattern Recognition, vol. 2, Aug. 11, 2002, 4 pages.

Gruhl et al., "The Web beyond Popularity—A Really Simple System for Web Scale RSS", in Proceedings of the 15th International Conference on World Wide Web, May 23, 2006, pp. 183-192.

Guy et al., "Finger on the Pulse: The Value of the Activity Stream in the Enterprise", In Proceedings of 14th IFIP TC 13 International Conference on Human-Computer Interaction, Sep. 2, 2013, 18 pages.

Guy et al., "Personalized Recommendation of Social Software Items Based on Social Relations", In Proceedings of the Third ACM Conference on Recommender Systems, Oct. 2009, pp. 53-60.

Hackett, Wes, "Extending the Activity Feed with Enterprise Content", In Proceedings of ActivityFeed, Development, Featured, Sharepoint, Social Features, Jun. 16, 2011, 27 pages.

Hanada, Tetsuya, "Yammer—Enterprise Graph SharePoint", In Australian Sharepoint Conference, Jun. 11, 2013, 23 pages.

International Search Report & Written Opinion Received for PCT Patent Application No. PCT/US2015/017865, dated May 27, 2015, 10 pages.

Josh, "Send Notifications to your Customers in their Timezone—training", Published on: Aug. 19, 2014 Available at: https://mixpanel.com/blog/2014/08/19/announcement-send-notifications-in-your-customer-s-timezone.

Kelly et al., "The Effects of Topic Familiarity on Information Search Behavior", Retrieved at http://www.ils.unc.edu/~dianek/kelly-jcd102.pdf, Joint Conference on Digital Libraries, Portland, Oregon, USA, Jul. 13, 2002, 2 pages.

Khodaei et al., "Social-Textual Search and Ranking", In Proceedings of the First International Workshop on Crowdsourcing Web Search, Apr. 17, 2012, 6 pages.

Kubica et al., "cGraph: A Fast Graph-Based Method for Link Analysis and Queries", In Proceedings of the IJCAI Text-Mining & Link-Analysis Workshop, Aug. 2003, 10 pages.

Li et al., "Research of Information Recommendation System Based on Reading Behavior", In International Conference on Machine Learning and Cybernetics, vol. 3, Jul. 12, 2008, 6 pages.

Liang et al., "Highlighting in Information Visualization: A Survey", In Proceedings of 14th International Conference Information Visualisation, Jul. 26, 2010, pp. 79-85.

Masuch, Lukas, "Hack: Enterprise Knowledge Graph—One Graph to Connect them All", Published on: Mar. 28, 2014, Available at : http://www.managementexchange.com/hack/enterprise-knowledge-graph-one-graph-connect-them-all.

(56) References Cited

OTHER PUBLICATIONS

Muralidharan et al., "Social Annotations in Web Search", In Proceedings of the ACM Annual Conference on Human Factors in Computing Systems, May 5, 2012, 10 pages.
Pecovnik, Simon, "Enterprise Graph Search—take 1", Published on: Jan. 28, 2014, Available at: http://www.ravn.co.uk/2014/01/28/enterprise-graph-search/.
Perer et al., "Visual Social Network Analytics for Relationship Discovery in the Enterprise", In IEEE Conference on Visual Analytics Science and Technology, Published on: Oct. 23, 2011, 9 pages.
Ronen et al., "Social Networks and Discovery in the Enterprise (SaND)", In Proceedings of the 32nd International ACM SIGIR Conference on Research and Development in Information Retrieval, Jul. 19, 2009, 1 page.
Roth et al., "Suggesting Friends Using the Implicit Social Graph", In Proceedings of the 16th ACM SIGKDD International Conference on Knowledge Discovery and Data Mining, Jul. 25, 2010, 9 pages.
Soussi, Rania, "Querying and Extracting Heterogeneous Graphs from Structured Data and Unstrutured Content", In Doctoral Dissertation, Ecole Centrale Paris, Jun. 22, 2012, 208 pages.
Ubbesen, Christian, "Enterprise Graph Search", Published on: Jan. 28, 2013, Available at: http://www.findwise.com/blog/enterprise-graph-search/.
Yap, Jamie, "Graph Search Capabilities Offer Enterprise Benefits", Published on: Feb. 14, 2013, Available at: http://www.zdnet.com/graph-search-capabilities-offer-enterprise-benefits-7000011304/.
Yeung, Ken, "Yammer Unveils the Open Graph for the Enterprise, to Help make Business Apps More Social", Published on: Oct. 29, 2012, Available at: http://thenextweb.com/insider/2012/10/29/yammer-using-the-enterprise-graph/?utm_source=feedburner&utm_medium=feed&utm_campaign=Feed:+TheNextWeb+(The+Next+Web+All+Stories).
Zhibao et al., "EISI: An Extensible Security Enterprise Search System", In 2nd International Conference on Computer Science and Network Technology, Dec. 29, 2012, pp. 896-900.
"International Preliminary Report on Patentability Issued in PCT Application No. PCT/US2015/017865", dated Mar. 18, 2016, 7 pages.
European Office Action in Application 15710653.5, dated Jul. 27, 2017, 8 pages.
U.S. Appl. No. 14/188,079, Notice of Allowance dated Sep. 7, 2017, 7 pages.
PCT International Preliminary Report on Patentability Issued in Application No. PCT/US2016/012399, dated Jul. 11, 2017, 9 Pages.
Resnick, "Request for Comments: 5322", Network Working Group, Qualcomm Incorporated, 57 pages (Oct. 2008).
"8 Things Marketers Ought to Know About Facebooks New Trending Feature", Retrieved from: https://web.archive.org/save/https://www.facebook.com/notes/brandlogist/8-things-marketers-ought-to-know-about-facebooks-new-trending-feature/650859898308191/, Jan. 30, 2014, 5 Pages.
"Trending—Definition and Synonyms", Retrieved from: https://web.archive.org/web/20170618063522/http://www.macmillandictionary.com:80/us/dictionary/american/trending, Jul. 18, 2014, 1 Page.
Dayal, Priyanka, "How Many Tweets Make a Trend?", Retrieved from: https://www.vuelio.com/uk/blog/how-many-tweets-make-a-trend/, Aug. 28, 2013, 5 Pages.
"Final Office Action Issued in U.S. Appl. No. 14/064,393", dated Mar. 4, 2019, 19 Pages.
"First Office Action and Search Report Issued in Chinese Patent Application No. 201580011895.1", dated Mar. 5, 2019, 18 Pages.
"Office Action Issued in European Patent Application No. 15710632.9", dated Feb. 18, 2019, 07 Pages.
"First Office Action and Search Report Issued in Chinese Patent Application No. 201580010703.5", dated Mar. 8, 2019, 12 Pages.
Yong Yin at al., An improved Search Strategy for Even Degree Distribution Networks, Jul. 2013, Academy Publisher, vol. 8, No. 7, pp. 1558-1565 (Year: 2013).
Jason J. Jung, Understanding information propagation on online social tagging systems, Nov. 4, 2012, Springer Science+ Business Media, Edition or vol. 48, pp. 745-754 (Year: 2012).
Barbie E. Keiser, Semisocial information Discovery, Novi Dec. 2013, Online searcher, pp. 16-22 (Year: 2013).
Anthony Stefanidis et al., Harvesting ambient geospatial information from social media feeds, Dec. 4, 2011, GeoJournal, Edition or vol. 78, pp. 319-338 (Year: 2011).
"Non Final Office Action Issued in U.S. Appl. No. 14/192,235", dated Dec. 26, 2018, 16 Pages.
"Final Office Action Issued in U.S. Appl. No. 14/593,650", dated Jan. 4, 2019, 35 Pages.
"First Office Action & Search Report Issued in Chinese Patent Application No. 201480058874.0", dated Dec. 5, 2018, 14 Pages.
"Second Office Action Issued in Chinese Patent Application No. 201580011895.1", dated Aug. 9, 2019, 6 Pages.
"Second Office Action and Search Report Issued in Chinese Patent Application No. 201480058874.0", dated Jun. 26, 2019, 14 Pages.
"Office Action Issued in European Patent Application No. 15771764.6", dated May 13, 2019, 9 Pages.
"Final Office Action Issued in U.S. Appl. No. 14/192,235", dated Jul. 25, 2019, 14 Pages.
"Non Final Office Action Issued in U.S. Appl. No. 16/275,386", dated Aug. 29, 2019, 36 Pages.
Mishra, et al., "Improving Mobile Search through Location Based Context and Personalization", In Proceedings of the International Conference on Communication Systems and Network Technologies, May 11, 2012, 5 Pages.
"Notice of Allowance Issued in U.S. Appl. No. 14/195,243", dated May 1, 2019, 10 Pages.
"Final Office Action Issued in U.S. Appl. No. 14/296,747", dated May 1, 2019, 30 Pages.
Bakhshandeh, et al.,"Personalized Search Based on Micro-Blogging Social Networks", In Proceedings of the CSI International Symposium on Artificial Intelligence and Signal Processing, May 2, 2012, 4 Pages.
"Advisory Action Issued in U.S. Appl. No. 14/064,393", dated Jun. 6, 2019, 6 Pages.
"Second Office Action Issued in Chinese Patent Application No. 201580010703.5", dated Oct. 24, 2019, 5 Pages.
"Non Final Office Action Issued in U.S. Appl. No. 14/296,747", dated Jan. 30, 2020, 32 Pages.
"Notice of Allowance Issued in U.S. Appl. No. 16/275,386", dated Mar. 6, 2020, 10 Pages.
Oyama, et al., "Analysis of Topics and Relevant Documents for Navigational Retrieval on the Web", In Proceedings of International Workshop on Challenges in Web Information Retrieval and Integration, Apr. 8, 2005, 6 Pages.
Chen, et al., "Towards Topic Trend Prediction on a Topic Evolution Model with Social Connection", In Proceedings of ACM International Conferences on Web Intelligence and Intelligent Agent Technology, Dec. 4, 2012, 5 Pages.
"Non Final Office Action Issued in U.S. Appl. No. 15/833,453", dated Dec. 17, 2019, 42 Pages.
"Final Office Action Issued in U.S. Appl. No. 15/833,453", dated May 4, 2020, 30 Pages.
"Non-Final Office Action Issued in U.S. Appl. No. 14/064,393", dated Sep. 26, 2019, 20 Pages.
"Office Action Issued in Mexican Patent Application No. MX/a/2017/002699", dated Feb. 14, 2020, 7 Pages.
"Office Action and Search Report Issued in Chinese Patent Application No. 201580047507.5", dated Apr. 3, 2020, 13 Pages.
"Non Final Office Action Issued in U.S. Appl. No. 14/192,235", dated Apr. 17, 2020, 16 Pages.
"Non Final Office Action Issued in U.S. Appl. No. 16/057,229", dated Jun. 9, 2020, 8 Pages.
"Final Office Action Issued in U.S. Appl. No. 14/064,393", dated Jun. 12, 2020, 27 Pages.

* cited by examiner

FIG. 5A

| A Score 0.9 | B Score 0.85 | C Score 0.8 | D Score 0.78 | E Score 0.77 |
|---|---|---|---|---|
| 505 | 510 | 515 | 520 | 525 |

FIG. 5B

| H Score 0.91 | I Score 0.88 | J Score 0.81 | A Score 0.75 | B Score 0.89 | C Score 0.75 | D Score 0.83 | E Score 0.6 |
|---|---|---|---|---|---|---|---|
| 530 | 535 | 540 | 505 | 510 | 515 | 520 | 525 |

FIG. 5C

| K Score 0.82 | L Score 0.71 | H Score 0.91 | I Score 0.88 | J Score 0.81 | A Score 0.75 | B Score 0.93 | C Score 0.7 | D Score 0.85 | E Score 0.52 |
|---|---|---|---|---|---|---|---|---|---|
| 545 | 550 | 530 | 535 | 540 | 505 | 510 | 515 | 520 | 525 |

Mobile Computing Device

DOCUMENT AND CONTENT FEED

BACKGROUND

Information workers/users have become accustomed to generating, editing and receiving large numbers of electronic documents and other information (e.g., electronic communications, images, data, etc.). In a given enterprise situation, for example, a company, school, social network, etc., a given information worker/user may encounter hundreds (or more) of documents or other content items, each with varying degrees of relevance or importance to the information worker. For example, the information worker may generate a document for a rush work project that may be of the highest relevance at the time of the project. For another example, the information worker may receive a document generated by his/her manager that similarly is of very high relevance to the information worker. On the other hand, he/she may receive a document or may have access to a document or other information via his/her enterprise dealing with a project he/she is no longer involved with, and thus, the document may be of low relevance or importance to the information worker. The typical information worker/user needs to know about those documents or other content or information items that are relevant, important or interesting to him/her, but he/she does not necessarily need to have all documents and/or other content items surfaced to him/her regardless of their relevance. Thus, a need exists for methods, systems, and articles of manufacture for surfacing documents and other information to a given user that might be important to the user without surfacing to the user documents or other information that are not particularly interesting or relevant to the user. It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing a document and content feed that surfaces to a user documents and other information items that are determined to be interesting or relevant to the user. Surfaced documents and other information may be displayed in an information feed that may be updated each time the feed is accessed by the user. Information not surfaced to the user in the feed may be accessed by the user via one or more other means, but only those items having a sufficient relevance to the user are surfaced in the feed.

According to embodiments, each user in a given enterprise has his/her own information feed. The feed is a sequence of items like documents, electronic mail items, images, other communications items and the like that are determined to be of sufficient interest or relevance to the user. The user may access the information feed through different front end applications operable for accessing the feed and for displaying its information to the user. When a user accesses his/her feed, a set of new items may be added to the feed based on their determined interest or relevance to the user. Such new items include information that an underlying ranking algorithm determines currently are the most interesting or relevant to the user and that are not currently included in the user's information feed. The new items that are added to the information feed are sorted in the feed based on a determined probability that they are interesting or relevant to the user.

When an item has been added to the information feed and is seen by the user, it will stay in the user's information feed at the same position in a persistent manner unless manually removed by the user. According to one embodiment, information items contained in the feed may be reposted to a different ordering position in the feed if their importance/relevance to the user changes significantly. That is, an item that is reposted may be moved to a different location in the feed as required based on a newly determined interest or relevance to the user.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings which are incorporated in and constitute a part of this disclosure, illustrate various embodiments of the present invention.

FIGS. 5A through 5F illustrate information items of varying relevance to a user surfaced in an information feed for the user.

DETAILED DESCRIPTION

Figure 1:
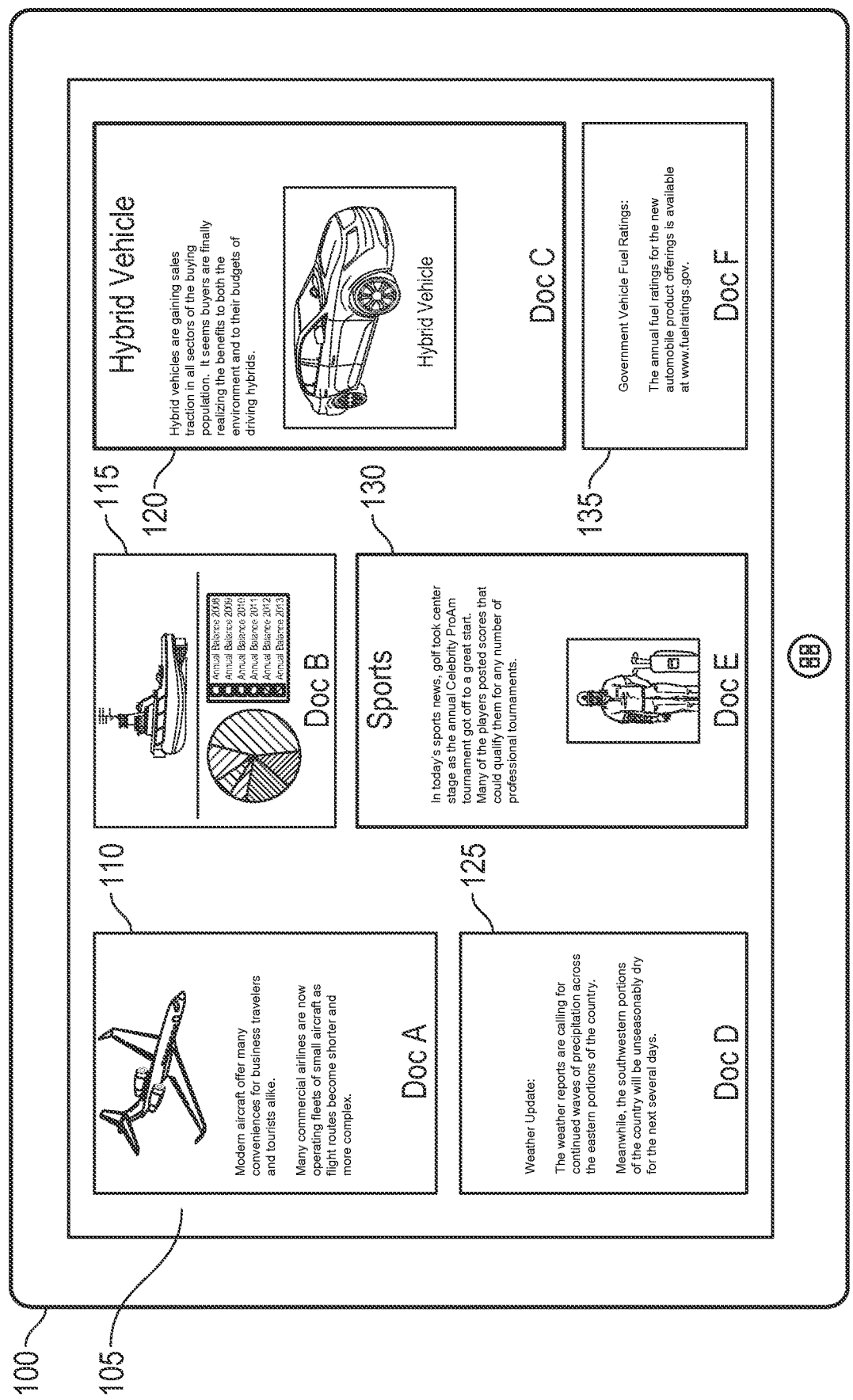
FIG. 1 illustrates an information feed showing a number of information items surfaced to a user.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

FIG. 1 illustrates an information feed showing a number of information items surfaced to a user. As illustrated in FIG. 1, a number of documents or other information items 110, 115, 120, 125, 130, 135 are displayed in an information feed 105 on the display surface of a computing device 100. According to embodiments, while a number of documents are illustrated in FIG. 1, items that may be displayed in the information feed may include any electronic item of sufficient interest or relevance to the user, for example, documents, images, photographs, electronic mail messages, text messages, telephone call messages, and the like. The computing device 100 illustrated in FIG. 1 is a tablet-style computing device, but as should be appreciated, the information feed 105 may be displayed on a display surface of any suitable computing device such as a desktop computer, laptop computer, tablet-style computer, handheld computing device, mobile telephone, and the like.

The information items illustrated in the information feed 105 are graphical representations of information items determined to be interesting or relevant to the user. As should be appreciated, and as described below, the information feed 105 may include many different information items that are updated each time the user accesses the information feed 105. According to embodiments, while new information items may be added to the information feed 105, those items presently contained in the information feed 105 are persisted in the feed indefinitely unless they are manually removed by the user at a subsequent time. The individual documents or other information items displayed in the feed 105 are displayed according to an order of interest, importance or relevance to the user. As new information items are added to the information feed, the new information items may be added to the front or top of the information feed, and the new information items may be displayed in the feed relative to each other according to the interest, importance or relevance to the user. According to embodiments, individual information items may be reposted to different positions in the ordering of displayed information items, and according to one embodiment, individual information items may be manually removed from the information feed by the user, if desired.

The information feed may be provided by a software application containing sufficient computer executable instructions for generating the information feed and for displaying the information items making up the information feed, as illustrated in FIG. 1. The information feed 105 may be accessed from a variety of different access points. For example, the information feed application may operate as a stand alone application, or may operate as a module of any of a variety of other applications, for example, word processing applications, spreadsheet applications, slide presentation applications, notes taking applications, desktop publishing applications, and the like for allowing a user to access and display his/her information feed, as desired. For example, if a user is operating a word processing application, the information feed application may operate as a module of the word processing application to allow the user to launch the information feed 105 in a display presentation provided by the word processing application for allowing the user to review those information items that have been added to his/her information feed.

Figure 2:
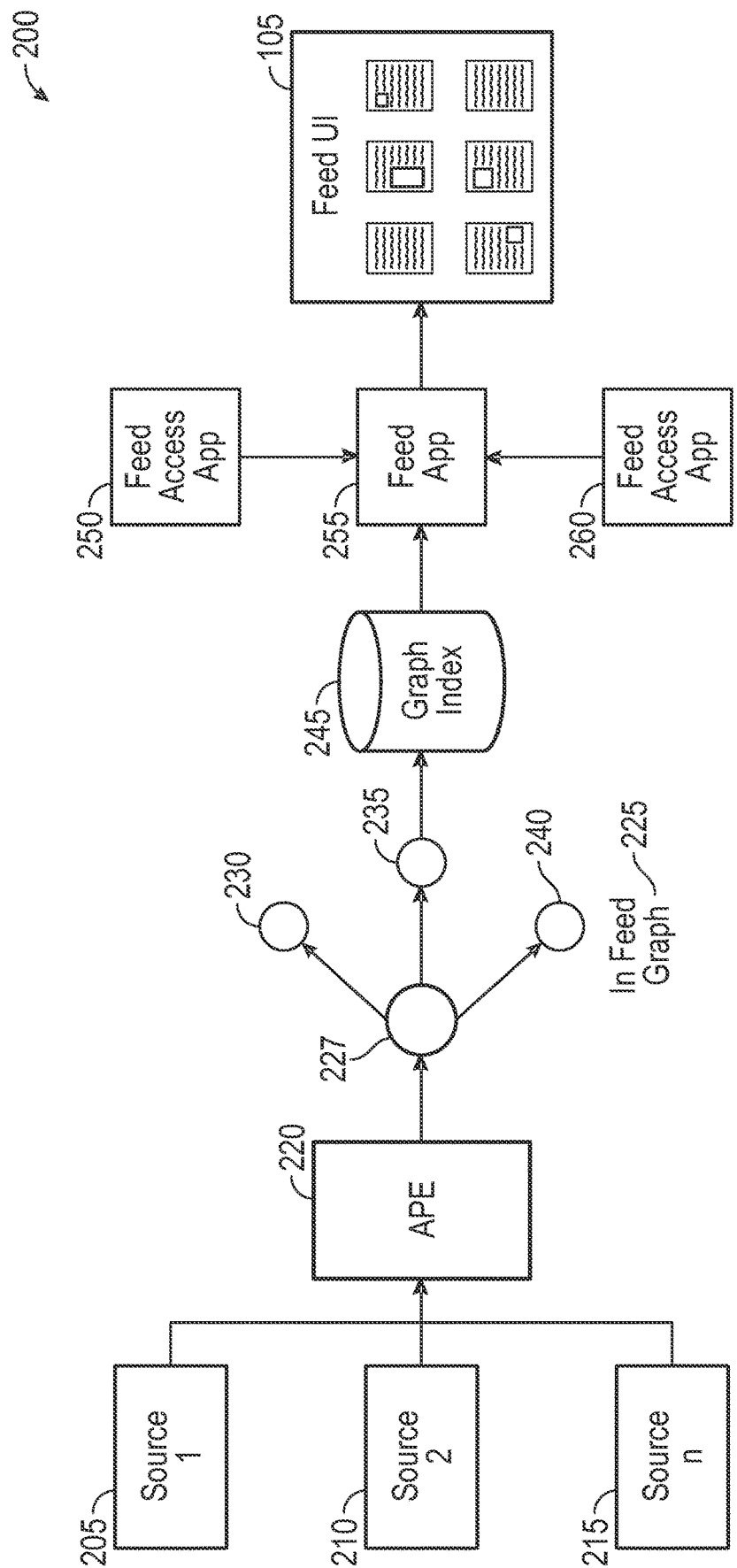
FIG. 2 illustrates a system for surfacing information to a user in an information feed.

FIG. 2 illustrates a system 200 for surfacing information to a user in an information feed. Information items making up the information feed 105 for a given user may come from a variety of sources 205, 210, 215. Such information sources may include client side information storage, remote storage (e.g. a remote server, local or remote databases, local or remote shared resources repositories, and the like). For example, a first source 205 may be a local client side memory containing documents, images, data files, communications items, such as electronic mail items, text messages, telephone messages, and the like. Similarly, the source 205 may represent a remote cloud-based storage medium that may be accessed by one or more client applications. As should be appreciated, each information type, for example, documents, may be stored in association with applications responsible for generating the information types, for example, word processing applications, spreadsheet applications, slide presentation applications, spreadsheet applications, and the like. Communications messages, for example, electronic mail messages may be associated with an electronic mail application, or an Internet-based mail service.

The second source 210 may be illustrative of a variety of other information sources that may contain information that may be placed in an information feed 105 such as social networking sites. For example, the source 210 may be a remotely based server system containing information of interest or relevant to a given user maintained for a social networking service accessed by the user. The third source 215 may be illustrative of any other information source from which information items as described herein may be collected and analyzed for their interest or relevance to a given user and for potential surfacing to the user in an information feed 105. As should be appreciated, the information sources 205, 210, 215 are for purposes of illustration only and are not limiting of the vast numbers of local and networked information sources from which documents and other content and information items may be retrieved for analysis and for inclusion in an information feed 105, as described herein.

As will be described in further detail below with reference to FIG. 4, information from the various sources may be retrieved and aggregated for ultimate analysis at the analysis processing engine (APE) 220, as illustrated in FIG. 2. That is, after information is retrieved and aggregated from the various information sources, the information may be passed to the analysis processing engine 220 for a determination of the importance or relevance of each information item to a given user for possible inclusion in the user's individualized information feed 105. That is, as will be described below, each information feed 105 is analyzed with respect to each individual user so that the information items surfaced to the user in his/her personalized information feed 105 will be those items that are determined to be interesting, important or relevant to the individual user. A more detailed discussion of the analysis of individual information items for possible inclusion in the information feed 105 is provided below with reference to FIG. 3.

Referring still to FIG. 2, information items analyzed by the APE 220 that are determined to be relevant to a particular user may be built into an infeed graph 225. Nodes 227, 230, 235, 240 of the infeed graph may represent different persons/users and may represent relations between the users in the form of edges where the edges may be representative of documents or other information items that form relationships between the users. For example, if a given document is created by one user, and is edited by another user, then two nodes of the infeed graph may represent the two users, and the document that is generated by a first user and is edited by a second user may be represented by an edge between the two user nodes with which relevance of the document to each user may be determined. As will be described in detail below, such relationships between users and information items may be used for determining the relevance of a given document or information item to a particular user. For example, if a user receives a document that was generated by the user's manager, the relationship between the user and his manager may be used for determining that the document generated by the manager for review by his/her direct report may be used for determining that the document is of high relevance to the direct report and is a good candidate for inclusion in an information feed 105 for the direct report.

Referring still to FIG. 2, after an infeed graph is generated for a particular user by analysis of various documents and other information sources, the infeed graph may be stored in a graph index 245 from which documents having sufficiently high rankings/scores as feed candidates may be pulled for generating an information feed 105. As should be appreciated, the graph index 245 may be illustrative of an index that points to storage locations where each item that will populate the feed 105 are located, or the graph index 245 may be illustrative of a storage location at which each item that will populate the feed 105 may be stored after being identified for inclusion in the feed 105.

As should be appreciated, the process of retrieving information from various information sources, analysis of the information, building an infeed graph for a particular user, and storing the graph in the graph index 245 is an iterative process that is updated as new information sources become available. That is, as will be described below, when an individual user accesses his/her information feed 105 his information feed 105 will be comprised of those documents or other information items having sufficient ranking for inclusion in the feed 105 at the time of access to the feed. Upon a subsequent access to the information feed, documents or other information items that have been subsequently added to the infeed graph through analysis of additional documents or other information may be added to the feed 105.

Referring still to FIG. 2, the feed application 255 is an application operable for extracting the documents or other information items from the graph index 245 for generating the information feed 105 and for displaying the documents or other information items comprising the present instance of the information feed 105 in a user interface, as illustrated above with reference to FIG. 1. The feed access applications 250, 260 are illustrative of one or more applications that may be operable for accessing the functionality of the feed application 255. As described above with reference to FIG. 1, functionality for accessing the feed application 255 may be operated as a software module of other applications, for example, word processing applications, spreadsheet applications, slide presentation applications, and the like such that a user may access and display his/her information feed 105 from any of these types of software applications. Alternatively, the feed application 255 may operate as a stand alone application for creating and displaying a given information feed 105.

According to embodiments, the components of the system 200 illustrated in FIG. 2 for generating and displaying an information feed 105 may operate as a collection of software modules and data sources operating at a single client side computing device, or components of the system 200 may operate at locations remote to each other such that the system 200 is operated over a distributed computing network, such as the Internet. For example, the information sources 205, 210, 215 may be maintained at various local or remote memory storage areas, the APE 220 may operate at a location remote from the graph index 245, and the feed application 255 and the various feed access applications 250, 260 may operate as client side applications or as remotely housed applications accessible at a client computing device.

As described above with reference to FIGS. 1 and 2, documents and other information items that may be included in a particular user's information feed 105 are analyzed to determine their importance or relevance to a particular user. As will be described below, each document or other information item, when analyzed, is provided with a ranking or score, for example, on a scale of zero to one, and the ranking or score is used for deciding the top X number of documents or other information items that may be used for generating a given instance of the information feed 105. According to one embodiment, all items having a score at or above a given threshold (e.g., a threshold score of 0.7) may be added to the feed 105. As will be described below with reference to FIGS. 5A through 5F, when the information feed 105 is generated, the documents or other information items contained in the information feed may be ordered based on the rankings or scores determined for each document or information item. For example, a document receiving a score/ranking of 0.90 may be ordered first, a document receiving a score/ranking of 0.80 may be ordered second, a document receiving a score/ranking of 0.70 may be ordered next, and so on. The number of documents or other information items that may be included in an initial instance of the information feed 105 may be a top X scored or ranked items, for example, the top ten scored or ranked items. As will be described below, each time a user accesses his/her information feed, a next top X number of newly analyzed documents or information items may be added to the information feed based on their scores or rankings.

As described above, information items that may be analyzed for possible inclusion in an information feed 105 may include documents, images, electronic communications, datasets, and the like. When analyzing an individual information item for ranking or scoring the individual information item for possible inclusion in the information feed, various attributes of an information item and relationships between people associated with the information item may be used for determining a particular ranking or score for the information item. Factors that may be used for ranking or scoring an individual item may include whether the document is generated by the user for which the information feed is being created. Other factors include whether the document has been viewed by colleagues of the user for which the information feed is being generated and which colleagues have viewed the document. For example, scoring/ranking may be different depending on whether a colleague is the user's manager, direct report, peer, or is unrelated to the user according to any particular enterprise structure.

Other scoring/ranking factors include a number of times the given information item has been viewed by one or more persons, and the frequency of viewings of the information item. Other factors include whether the information item has been sent to the user for which the feed is being generated and, if so, by whom. Other factors include an analysis of topics included in a given information item. For example, text strings from a document or other information item may be extracted and may be compared against text strings contained in other documents or information items already contained in the information feed 105 for the user, or contained in or associated with other documents that have been previously ranked or scored sufficiently for inclusion in an information feed 105. Additional information that may be utilized for determining a scoring or ranking for a given information item may include social interaction with the information item. For example, information showing that a given information item has been commented on, liked, viewed, or otherwise utilized in a social network may be utilized in determining a scoring or ranking for a given information item.

Figure 3:
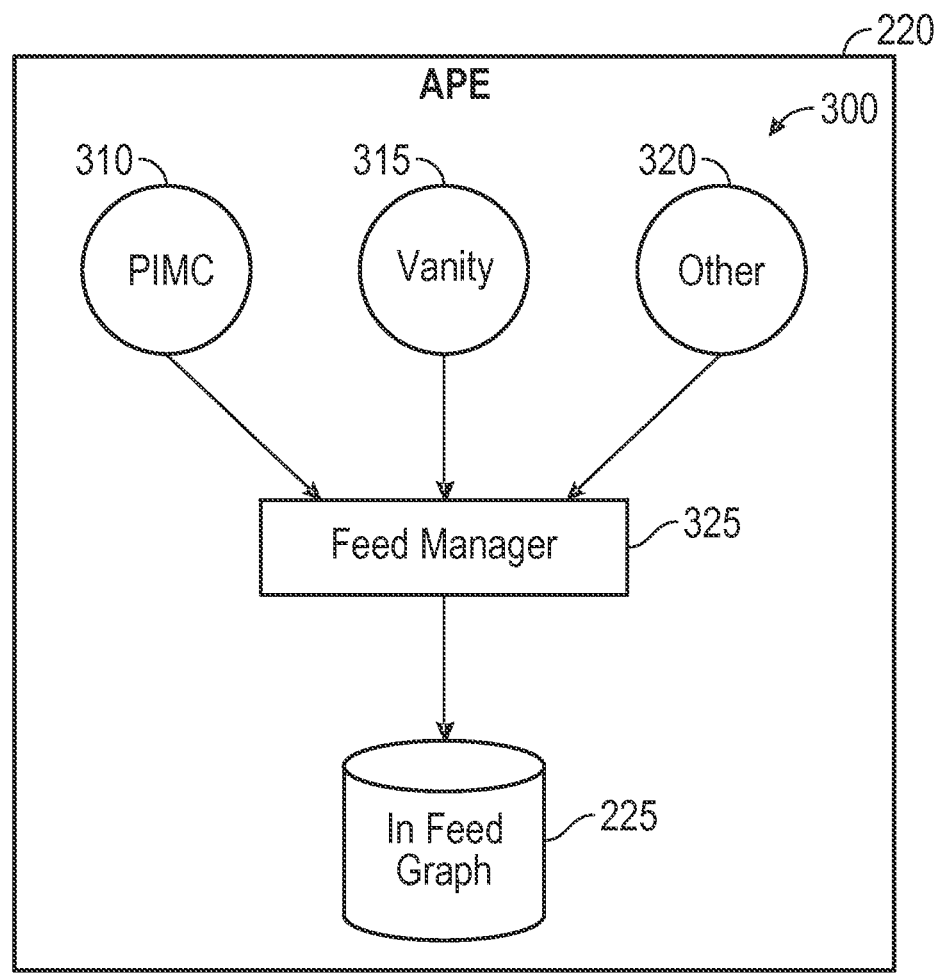
FIG. 3 illustrates one system for determining interest or relevance of an information item for surfacing the information item in an information feed.

According to an embodiment, back-end or client side ranking modules may at frequent, regular intervals monitor activities in a given enterprise including a monitoring of various information items generated, received by or sent from the enterprise for determining a set of information items that should be added to the information feed 105 of a given user when the user next accesses the information feed. Referring now to FIG. 3, one embodiment of a back-end or client side ranking module or system 300 is illustrated. The system 300 is illustrated as operating as a part of the analysis processing engine 220, illustrated in FIG. 2. As should be appreciated, however, the ranking system 300 may be operated remotely from the APE 220, and the results of the system 300 may be passed to or commanded by the APE 220, as required.

Referring still to FIG. 3, the PIMC module 310 is illustrative of those documents or information items that are "popular in my circle" (PIMC). According to embodiments, the module 310 is a ranking module which estimates importance of documents or other information items based on how popular each document or information item is among the colleagues of the user or other persons associated with the user in any other manner. For example, a document from the user's manager may receive a higher score/ranking than a document from the user's direct report or peer.

The vanity module 315 is a ranking module which estimates the importance of the user's own documents or information items based on the number of recent views, edits or other interactions of the user with a given document or information item. For example, a document the user views every day, for example, a department spreadsheet may receive a higher ranking than a document the user views once per quarter.

The other module 320 is a ranking module which estimates the importance of each document or information item based on some other factor, for example, whether the document or information item is part of a collaborative work group with which the user is associated and/or statistical information associated with the document or other information item, for example, how often the document is viewed, or otherwise utilized by members of the user's collaborative work group. As should be appreciated, any number of ranking modules may be utilized for assisting in the generation of a ranking or scoring for a given document or information item, as described herein.

Referring still to FIG. 3, after each of the ranking modules 310, 315, 320 provide a ranking or scoring for each document or other information item, the rankings or scorings of each of those modules with respect to each document or other information item may be passed to a feed manager which may generate an overall ranking or score for each document or information item that may be placed in an infeed graph 225 and that may be ultimately stored in the graph index 245 for retrieval and population into an information feed 105. For example, the feed manager may simply average the scores or rankings provided by each of the ranking modules 310, 315, 320, or the feed manager may be tuned to place more emphasis on the ranking/score of any individual ranking module. For example, a given composite ranking or score for a document or other information item may be comprised of 50% of the score from the module 310, 25% of the score from the module 315 and 25% of the score from the module 320.

As should be appreciated, this example is for purposes of illustration only as the portions of the given rankings or scores from any individual module may be modified from time to time in order to generate an information feed 105 that is most relevant for a given user or class of users. For example, in a given enterprise, it may be determined that the scoring associated with the importance of a document based on its popularity among the colleagues of a given user is more valuable than the scoring associated with a document based on its viewing by the user for which the information feed is being generated.

According to one embodiment, the system 300 is comprised of only the PIMC module 310 and the vanity module 315 for providing scorings or rankings to the feed manager 325 for generating the infeed graph 225. According to this embodiment, the PIMC analysis may continue to calculate a top X candidates (e.g., top 100 documents per user). These should be added as edges to the graph 225 and should be given to the Feed Manager as a list of candidates for the feed 105. The Vanity analysis may look at all documents or other information items created or modified by the user, and it may create a list of the items (e.g., list of 5 documents) with a highest event rate (i.e., access and/or use by the user).

According to this embodiment, each time the Feed Manager 325 is run, it creates a new "Future" for the user. As described more below, the "Future" includes one or more information items that may be added to the information feed 105 when the user next accesses it. The algorithm below describes how the Feed Manager creates the "Future" based on the two categories of items that are available according to this embodiment: PIMC and Vanity. As should be appreciated, the algorithm set out below is only one example operation of the Feed Manager and is for purposes of illustration only.

First, the Feed Manager creates an initial list of documents or other information items to post to the feed graph. Next, the Feed Manager reviews a top X items (e.g., top 40) of the PIMC list and adds to the list any of these items that are not in the "Past" ("Past" being items already added to the feed 105 previously). Next, the Feed Manager reviews a top X items (e.g., top 5) of the Vanity list and adds to the list any of these which are not in the "Past." If the user does not have as many as the top X Vanity list items with activity the last X days (e.g., last 14 days), the list may be reduced accordingly. According to one embodiment, any of the top 2 items in the Vanity list which is in the "Past," but not in the top 20 also may be added to the list.

According to the present example operation, the Feed Manager may require at least k (with default value of 8) new documents or other information items per week up to a maximum of $D_{max}$ (also with default value of 8) items. To do this, the Feed Manager may check how long ago the last item was added to the feed. Assuming T hours since the last item was added, the Feed Manager may calculate the number $$D = \min\left(\left\lfloor \frac{\tau}{24*7}k \right\rfloor, D_{max}\right).$$

If the number of documents in the list to post is less than D, the Feed Manager may traverse the PIMC list beyond position of the top X items reviewed from the PIMC (e.g., beyond 40 items). It may then add items not yet in the "Past" until the total count of the post list reaches D.

Continuing with the present example, the list of documents or other items to post to the feed is now ready, and is separated into two categories: PIMC items and Vanity items. Within each of the categories, the list is sorted by relevance score. The following algorithm may be used for merging the category lists. Assume there are p PIMC items and v Vanity items. Generate a random variable r between 0 and 1. If r<p/(p+v), post the best PIMC item on top. Otherwise, post the best Vanity item on top. Update the values of p and v, create a new random variable, and repeat until all items are posted. The random variables must be chosen so that for the same lists of documents, the posting order is the same each time the Feed Manager runs. For example, this may be obtained by using an identification number/code (e.g., "docid") for the first PIMC item as the seed for the random variable.

According to this embodiment, the PIMC cutoff of X items (e.g., 40 items) and the Vanity cutoff of X items (e.g., 5 items) may be modified from time to time to change the nature of the items being added to the feed 105. Lower numbers may improve precision, but may result in too few items being added to the feed 105. Likewise, higher numbers may allow too many items to be added to the feed, and some of such items may not be particularly interesting or important to the user for which the feed is being generated. In addition, more items categories, for example, the other category/module 320, illustrated in FIG. 3, and a similar analysis of those items may be performed for considering those items for inclusion in the feed 105.

As briefly described above, with reference to FIG. 2, as information is gathered from the various sources 205, 210, 215 for presentation to a ranking system 300 as part of the analysis processing engine 220, the information may be aggregated, and determinations of such information as the number of viewings of a given user for a given document or information item, the popularity of a given document or information item among colleagues of a user, comments or interactions with a document or information item via social networks, and the like may be determined. Such information for each document or information item may be aggregated for use by the ranking systems 300 as part of the analysis and processing engine 220, as described above with reference to FIG. 3.

Figure 4:
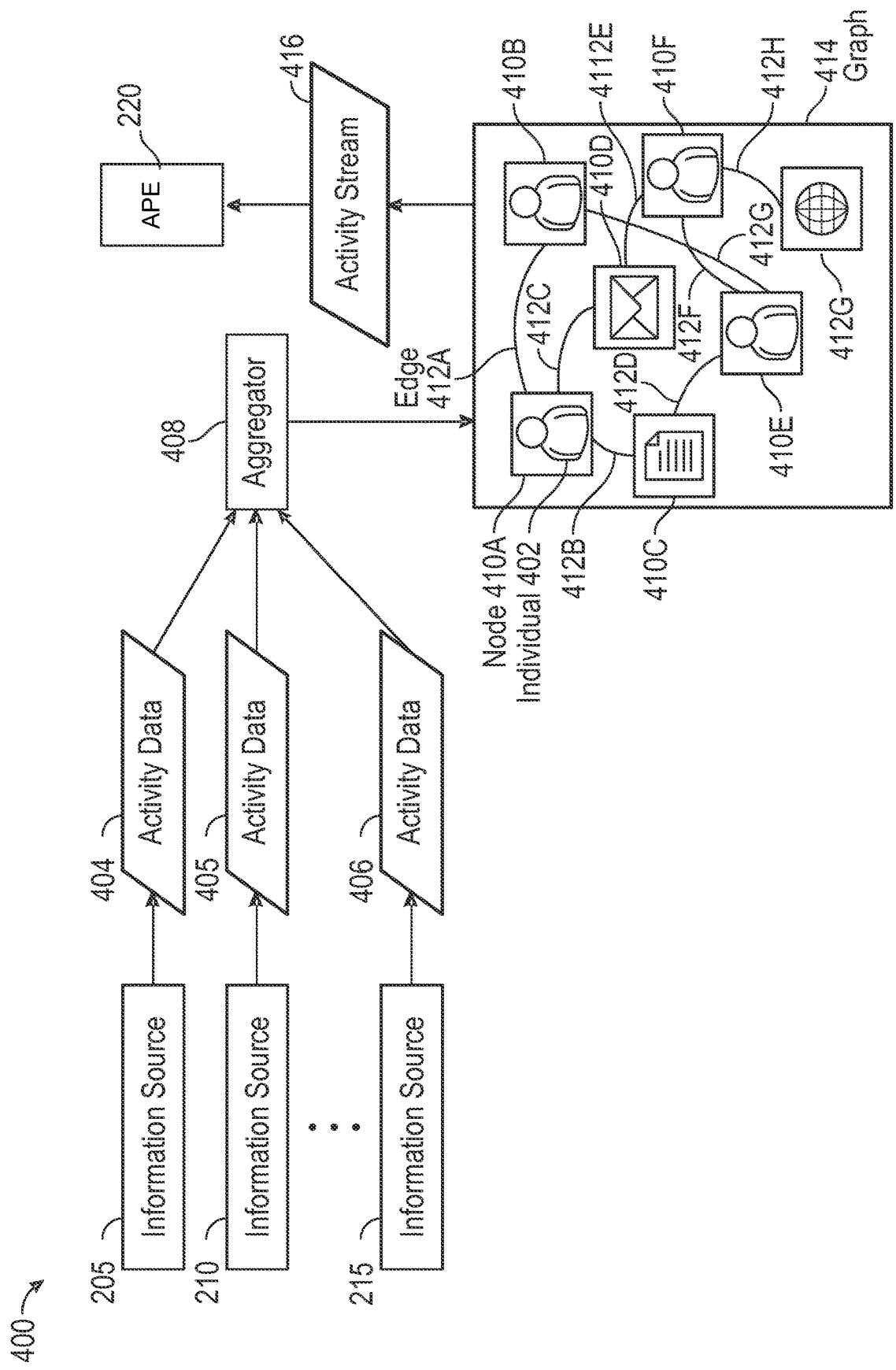
FIG. 4 illustrates a system for gathering and aggregating information across a variety of information sources that may be surfaced in an information feed.
Figure 6:
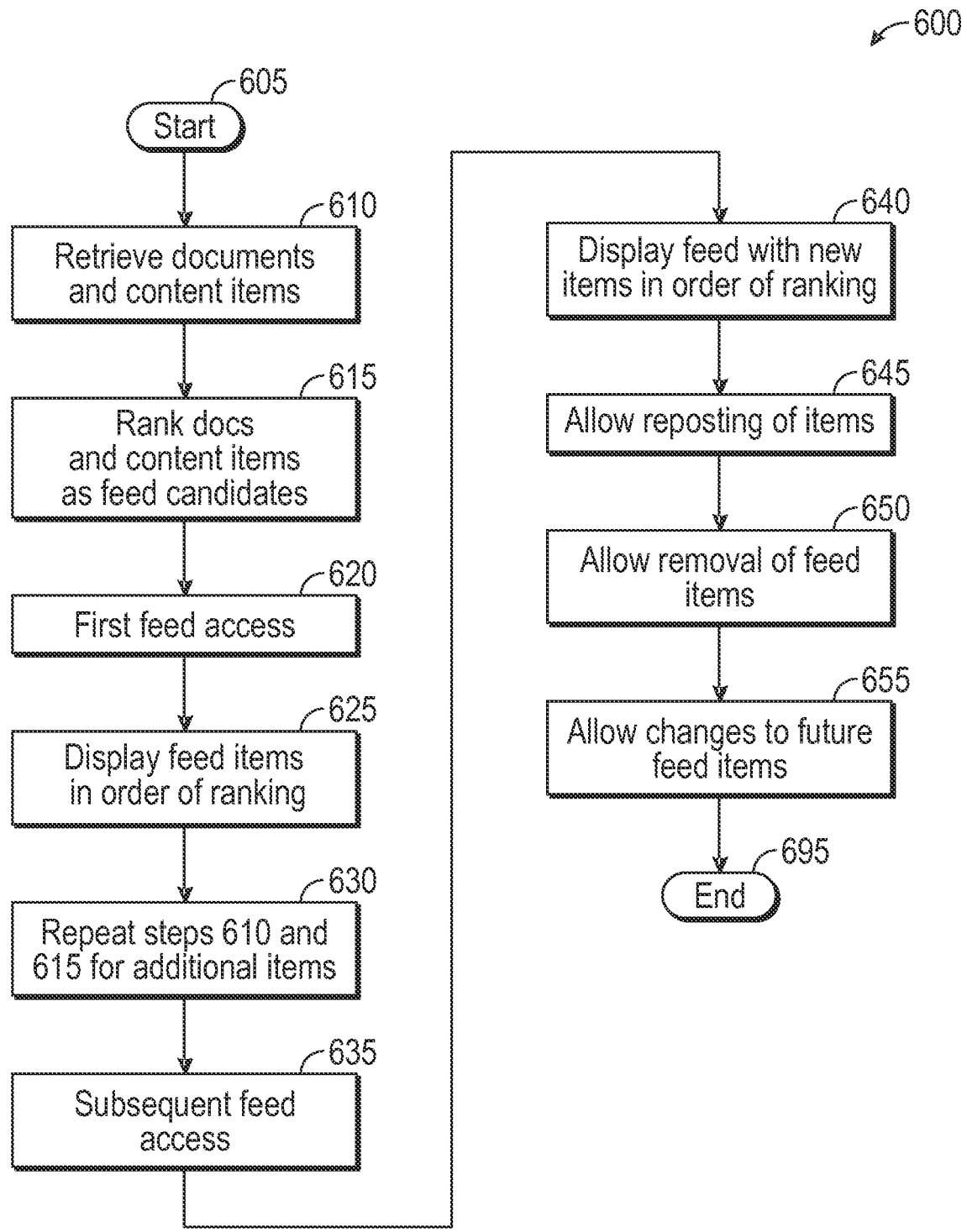
FIG. 6 is a flow chart illustrating a method for surfacing information to a user in an information feed.

FIG. 4 is a block diagram illustrating a system architecture 400 for aggregating information items and for providing an activity stream across multiple information sources that may be built into a knowledge graph from which information items may be pulled by the system 300 for analysis and potential inclusion in the feed 105, as discussed above. According to embodiments, the system 400 may lie between the information sources 205, 210, 215 and the APE 220 for gathering information on various information items needed by the APE for feed analysis and generation. The system architecture 400 includes an aggregator 408 operable to collect activity data 404, 405, 406 for an individual 402 or group of individuals from a plurality of information sources 205, 210, 215 and store the activity data in a graph 414. The information sources may include any number of sources from which items may be pulled as feed candidates, as described above with reference to FIG. 2.

Activity data 404, 405, 406 may comprise various types of information such as, but not limited to, presence data, data associated with authoring or modification of an information item (e.g., document), trending data, feedback data (e.g., like, comment, follow, share, etc.), data associated with organizational structure (e.g., who an individual works with, works for, interacts with, is a peer to, directs, manages, is managed by, has in common with another individual, etc.). As mentioned above, the activity data may be stored in a graph 414. Actions may be stored as edges 412A-H (collectively 412), and entities that are acted upon may be stored as nodes 410A-G (collectively 410). For example, a node 410 may include an individual 402 (nodes 410A,B,E,F), a group of individuals, a document (node 410C), an email or other communication type (node 410D), a webpage (node 410G), etc. An edge 412 may include various types of actions (e.g., like, comment, follow, share, authoring, modifying, organizational relationship, communication, participation, etc.). Consider for example that an individual 402 "likes" a certain document (i.e., selects a "like" option associated with the document). The individual and the document may be stored as nodes 410 and the "like" selection may be stored as an edge 412.

The APE 220 may view/retrieve enterprise activity for an individual 402 or group. According to embodiments, a group may be a formalized set of individuals according to an organizational hierarchy or project structure, or may be a less formally coupled set of individuals such as a group of individuals who are common attendees of a particular meeting, a project group, a group of individuals who share a common interest in a particular topic, etc. An individual 402 may be a part of a plurality of groups. As illustrated in FIG. 4, the APE 220 may request an activity stream 416 for retrieving information items and for categorizing information items (e.g., PIMC or Vanity) as described above. According to one embodiment, a request may be triggered by the Feed Manager 325 in an iterative process for analyzing new candidates from the various information sources 205, 210, 215 for inclusion in the feed 105.

As described above with reference to FIGS. 1 through 4, when a user accesses the information feed 105 either as a first access of the information feed 105, or as a subsequent access of the information feed, the information feed 105 is built by placing those documents and/or information items in the information feed in the order of the ranking or scoring that has been applied to each document. The resulting information feed is stored in the graph index 245, and is retrieved by the feed application 255 upon command for presenting the documents in an information feed user interface, as illustrated in FIG. 1. FIGS. 5A through 5F illustrate information items of varying importance or relevance to a user surfaced in an information feed for the user. As described above, each user has an individual information feed 105, and the information feed 105 is a stream of information items that has been important to the user at some point and that has been ranked for inclusion in the information feed, as described above. The user's information feed 105 is updated when, and only when, the user opens or refreshes the feed in a user interface, as illustrated above with reference to FIG. 1. Once an information item is added to the user's feed, it stays in the user's feed persistently, unless the user manually removes the item from the information feed, as described below. Alternatively, the information feed may have a fixed upper limit S to its size, so that an item may be removed from the feed when there are S items before it in the feed. The feed is ordered, and the order never changes (with some exceptions, as described below).

Referring now to FIG. 5A, an instance of an information feed 105 is illustrated containing information items 505, 510, 515, 520, 525. As illustrated, each of the information items are displayed in the information feed according to a ranking/scoring applied to each individual item. For example, item A has a score or ranking of 0.9 and thus is in a first position in the information feed, whereas item E has the lowest score of the grouping of information items with a score of 0.77 and is placed at the end of the string of information items. According to one embodiment, the first time a user opens the information feed illustrated in FIG. 5A, the top X ranked items (e.g., top ten items) are surfaced in the information feed and are sorted according to the scoring or ranking, as illustrated in FIG. 5A.

Referring now to FIG. 5B, the next time the user opens the information feed, additional documents or information items 530, 535, 540 are added to the information feed where those additional information items were analyzed by the APE 220 and received scorings or rankings sufficiently high enough for inclusion in the information feed 105. For example, the information item H received a score of 0.91, the item I received a score of 0.88, and the item J received a score of 0.81. Thus, the information feed presented to the user as illustrated in FIG. 5B now contains the new information items added to the top or front of the feed in importance or relevance order based on scores or rankings applied to each of the new items.

Referring still to FIG. 5B, note that the scores for some of the information items are different from the scores for the same items as illustrated in FIG. 5A. That is, item B (510) had a score of 0.85 in the first instance of the feed illustrated in FIG. 5A, but has a score of 0.89 in the second instance of the feed illustrated in FIG. 5B. Likewise, item A (505) had a score of 0.9 in the first instance of the feed but has a score of 0.75 in the second instance of the feed, illustrated in FIG. 5B. According to one embodiment, once the documents or other information items are surfaced in the information feed according to a particular order, the order is maintained even if the scoring or rankings for individual items change with each subsequent access to the information feed. That is, when the second instance of the information feed is generated as illustrated in FIG. 5B, the scores of some of the previously surfaced documents or information items may change when ranked in association with new documents or information items 530, 535, 540 added to the information feed.

In order to avoid confusing the user as to the nature of the documents or other information items contained in his/her information feed, the displayed ordering of the documents or information items is maintained with each subsequent instance of the information feed, with exceptions described below. That is, the first five documents or information items A-E are maintained in the same relative order with each instance of the information feed, and new items, for example, items H, I, J are surfaced in order of their rankings or scorings, and the orderings of the two sets of documents or information items relative to each other will be maintained in subsequent instances of the information feed.

Referring now to FIG. 5C, each consecutive time the user opens the information feed, new documents may be added to the feed. However, the number of documents or information items is not a fixed number. It depends on the availability of new documents or other content items for the user and on any personalized settings applied to the feed by the user, for example, a total number of documents or information items that may be surfaced in the user's feed according to the user's desire, or a bottom threshold ranking or score for a document or content item that may be surfaced in the information feed, and the like. However, referring to FIG. 5C, as should be appreciated, even if no new documents or information items are received by the APE 220, new documents or information items may nonetheless be added to the information feed by selecting documents or information items previously analyzed that did not have sufficient scores or rankings for inclusion in the information feed but that now may be added if the scoring or ranking for those documents relative to other documents or information items that have been added to the information feed changes the determination of the importance of those documents or information items to the overall feed.

Notwithstanding, a lower scoring or ranking boundary may be applied to prevent including items in the information feed that clearly are not relevant enough for inclusion in the user's feed. As illustrated in FIG. 5C, two additional information items 545, 550 have been added in order to provide new information to the information feed, but as illustrated in FIG. 5C, the scoring or rankings for the information items may be relatively low compared to the scorings or rankings of other information items, but are added to ensure the feed is updated when the user accesses the feed. As should be appreciated, when the user refreshes the feed application 255, new documents or information items may be added in the same way as if the user reopens the application to generate a new instance of the information feed 105.

Figures 5D, 5E, 5F:
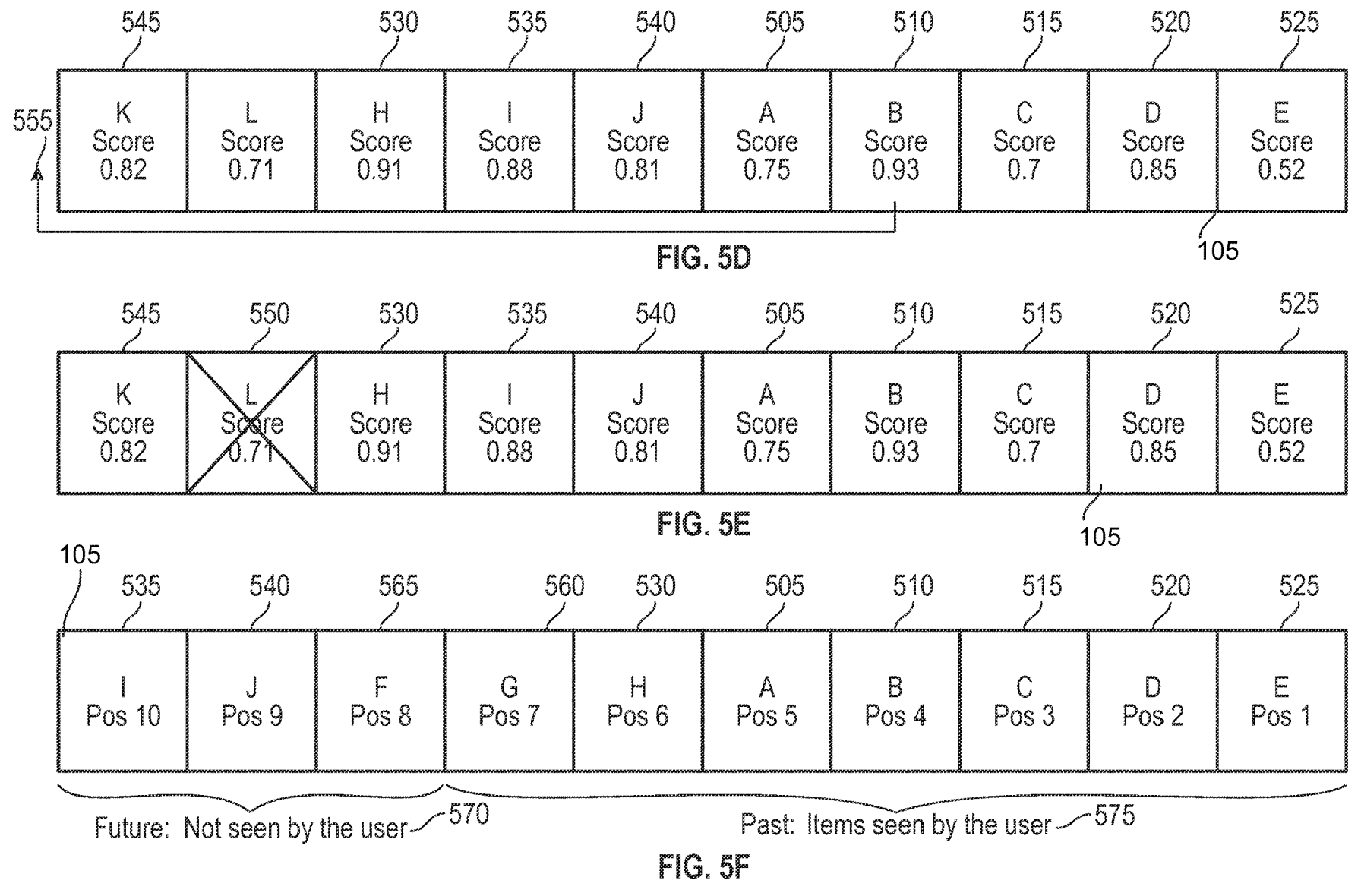

Referring now to FIG. 5D, according to one embodiment, when a user opens the feed application 255, or refreshes the feed application 255, information items may be reposted to a different location in the information feed if the scoring or ranking for one or more information items has increased or decreased significantly relative to other items in the information feed or relative to new items being added to the information feed. As illustrated in FIG. 5D, information item B (510) has received a new scoring or ranking of 0.93 relative to each of the information items contained in this instance of the information feed, and therefore, according to this embodiment, item B may be reposted to the top or front of the information feed 105 to a new position 555, as illustrated in FIG. 5D. This is an alternative to the previously described embodiment where each item is displayed in the information feed in the same position relative to other items. According to this embodiment, if the scoring or ranking of an individual item grows so significantly that it should be placed in front of other items, or if its importance to the user decreases so significantly relative to other items that it should be moved to a lower position in the information feed, then such changes may be made.

Referring now to FIG. 5E, according to another embodiment, an information item may be manually removed from the information feed by the user upon command. For example, referring to FIG. 5, the user may determine that item L (550) is no longer important to the user notwithstanding a score or ranking applied to the item by the APE 220, and thus, the user may decide to manually remove that information item from the information feed. For example, if the information feed illustrated in FIG. 5E is comprised of documents that have been generated as part of the user's collaborative work group, and the document L (550) while receiving a ranking or score sufficient for inclusion in the information feed is no longer important to the user because the subject of the document or information item has been completed or has otherwise been dispensed with by the user's work group, the user may decide to manually remove that document or information item from the information feed in order to make room for additional information items or in order to remove unnecessary information items from his/her feed.

Referring now to FIG. 5F, as discussed above, the APE 220 and/or feed application 225 tracks the most recent instance of the feed that has been seen by the user. According to one embodiment, documents or information items contained in an instance of the feed that has been viewed by the user may be referred to as the "Past" 575. However, as described above, the APE 220 is from time to time scoring documents and information items that are being analyzed for inclusion in a future instance of the information feed for when the user next accesses a next instance of the information feed. Those items that have been placed in the graph index 245 for inclusion in a future instance of the information feed are referred to as the "Future" 570. According to one embodiment, as long as documents or information items are characterized as "Future" documents or information items that will be surfaced to the user in a future instance of the information feed, those documents or information items may be changed, including re-ranking or re-scoring those items which may result in removing one or more of those items from the future instance of the information feed 105. Once the user actually opens a future instance of the feed 105 and views new documents or information items, those viewed documents or information items will now be part of the information feed characterized as the "Past" and will stay in the feed unless removed as described above.

Having described an operating environment and various aspects of embodiments of the invention with respect to FIGS. 1-5, FIG. 6 is a flow chart illustrating a method for surfacing information to a user in an information feed. The routine 600 begins at start operation 605 and proceeds to operation 610 where documents and information items are retrieved from various information sources 205, 210, 215 by the APE 220 for analysis as candidates for inclusion in a user's information feed 105. As described above with reference to FIG. 4, information items retrieved from the various information sources may first be analyzed, and an activity stream may be generated for the information items for assisting in a determination of the importance or relevance of each item to a given user.

At operation 615, the ranking or scoring system 300 operating in association with the APE 220 scores or ranks each document or information item as feed candidates, as described above with reference to FIG. 3. Documents or information items receiving a scoring or ranking sufficient for inclusion in an information feed 105 are placed in an infeed graph and are stored in the graph index 245 for retrieval by the feed application 255 when a user first or next accesses his information feed 105. As should be appreciated, any documents or information items not included in the infeed graph owing to the lack of a sufficient scoring or ranking are not discarded but are maintained for subsequent analysis relative to other items that subsequently may be considered as feed candidates.

At operation 620, a user accesses his information feed via the feed application 255 or via a feed access application 250, 260, illustrated and described above with reference to FIG. 2. At operation 625, the documents or other information items grouped together in the infeed graph 225 are displayed as an information feed 105 in an information feed user interface in order of the ranking or scoring applied to each document or information item, as illustrated in FIG. 1 and FIGS. 5A through 5F. At operation 630, operations 610 and 615 may be repeated as additional documents and information items are received by the APE 220 from the sources 205, 210, 215.

As new items are received and analyzed and scoring or rankings are applied, new instances of the information feed may be generated and the new instances of the information feed will be characterized as "Future" instances of the information feed until accessed by the user. At operation 635, a subsequent feed access is received by the user, and at operation 640, the "Future" documents or information items are displayed in the feed 105 in order of ranking/scoring, as illustrated and described above with reference to FIG. 5B.

At operation 645, reposting of documents or information items contained in the information feed may be allowed, if one or more documents or information items receives a new scoring or ranking relative to other items sufficient for moving the document or information item to a new location in the information feed 105. At operation 650, removal of a given document or information item from the information feed may be enabled, if a user determines that a given document or information item is no longer important to the user notwithstanding a scoring or ranking applied to the document or information item sufficient for maintaining it in the information feed. At operation 655, changes to items characterized as "Future" items may be enabled, as illustrated and described above with reference to FIG. 5F, if scoring or ranking for such items has changed relative to other items such that maintenance of those items in the information feed as "Future" items is no longer warranted. The routine ends at operation 695.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 7:
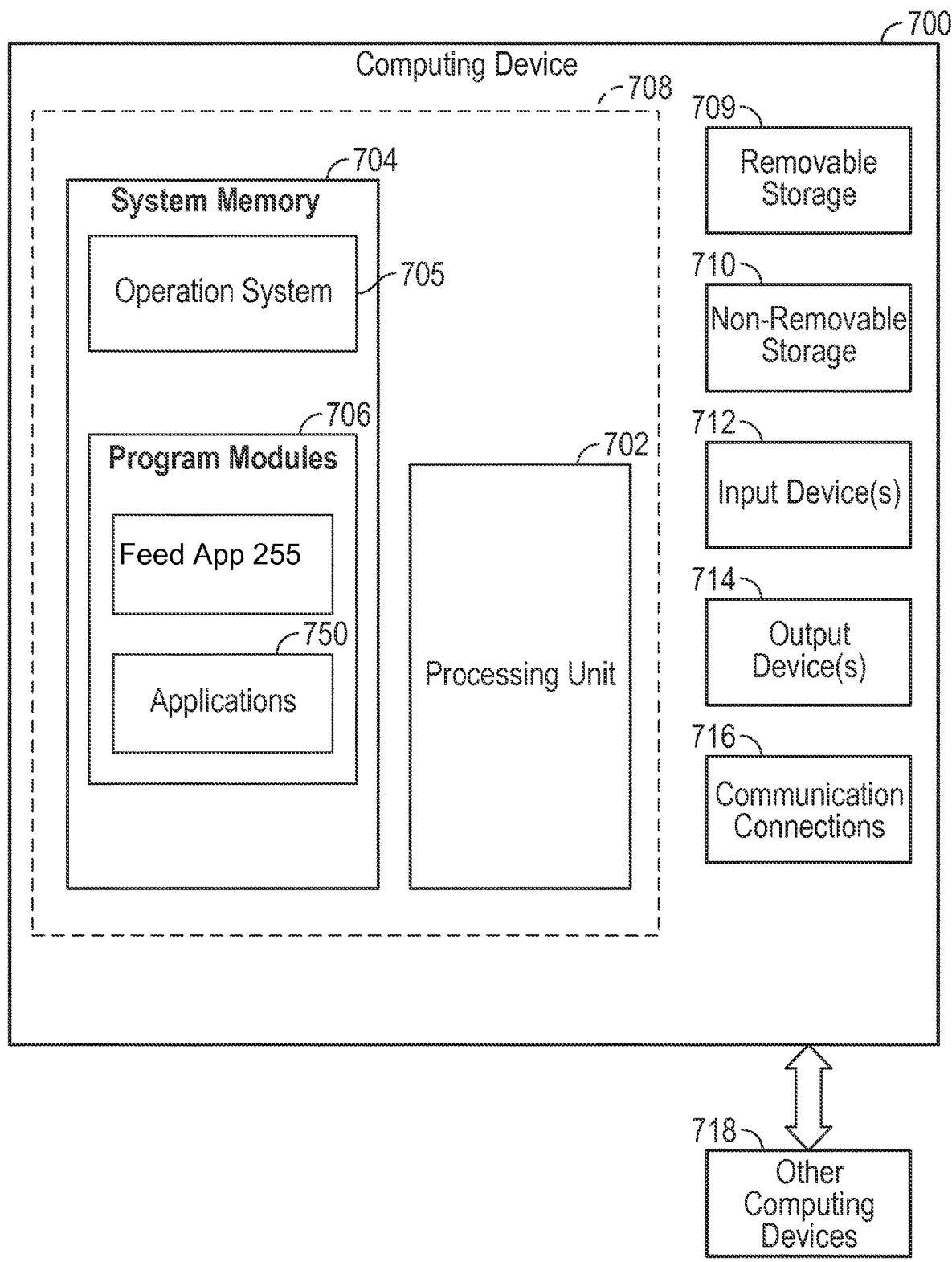
FIG. 7 is a block diagram illustrating example physical components of a computing device with which embodiments of the invention may be practiced.
Figure 8A:
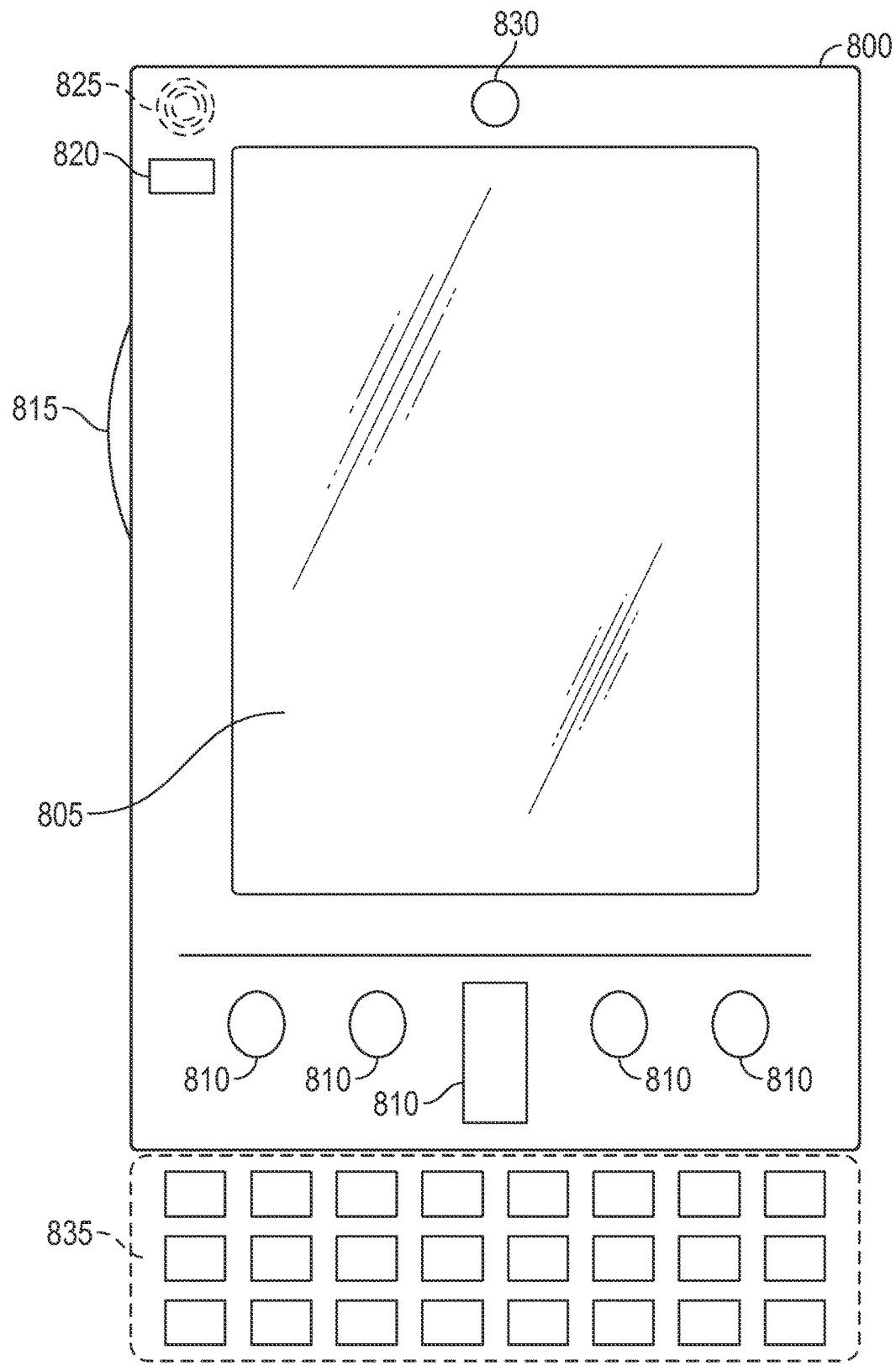
FIGS. 8A and 8B are simplified block diagrams illustrating components of a mobile computing device with which embodiments of the invention may be practiced.
Figure 8B:
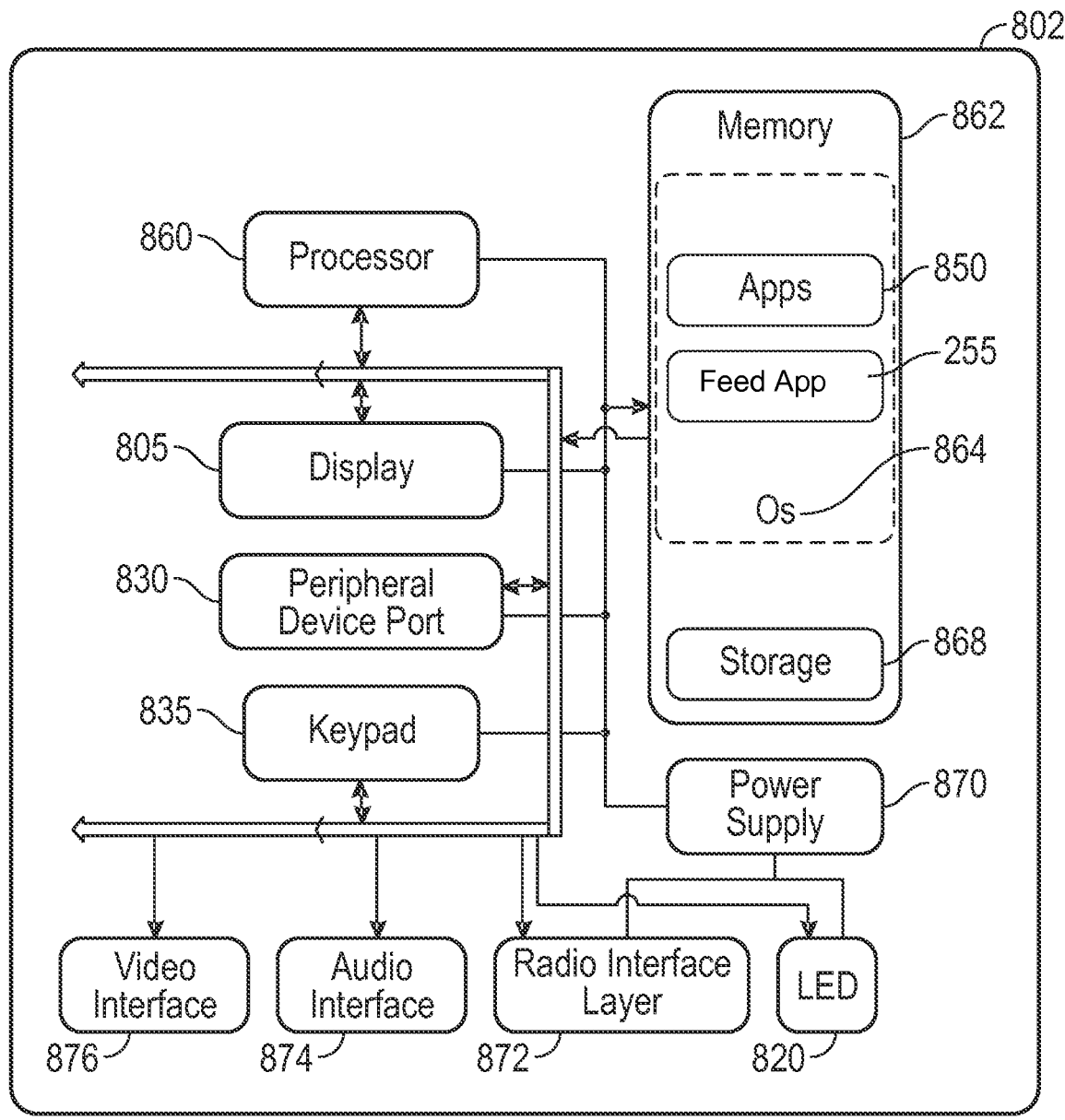
Figure 9:
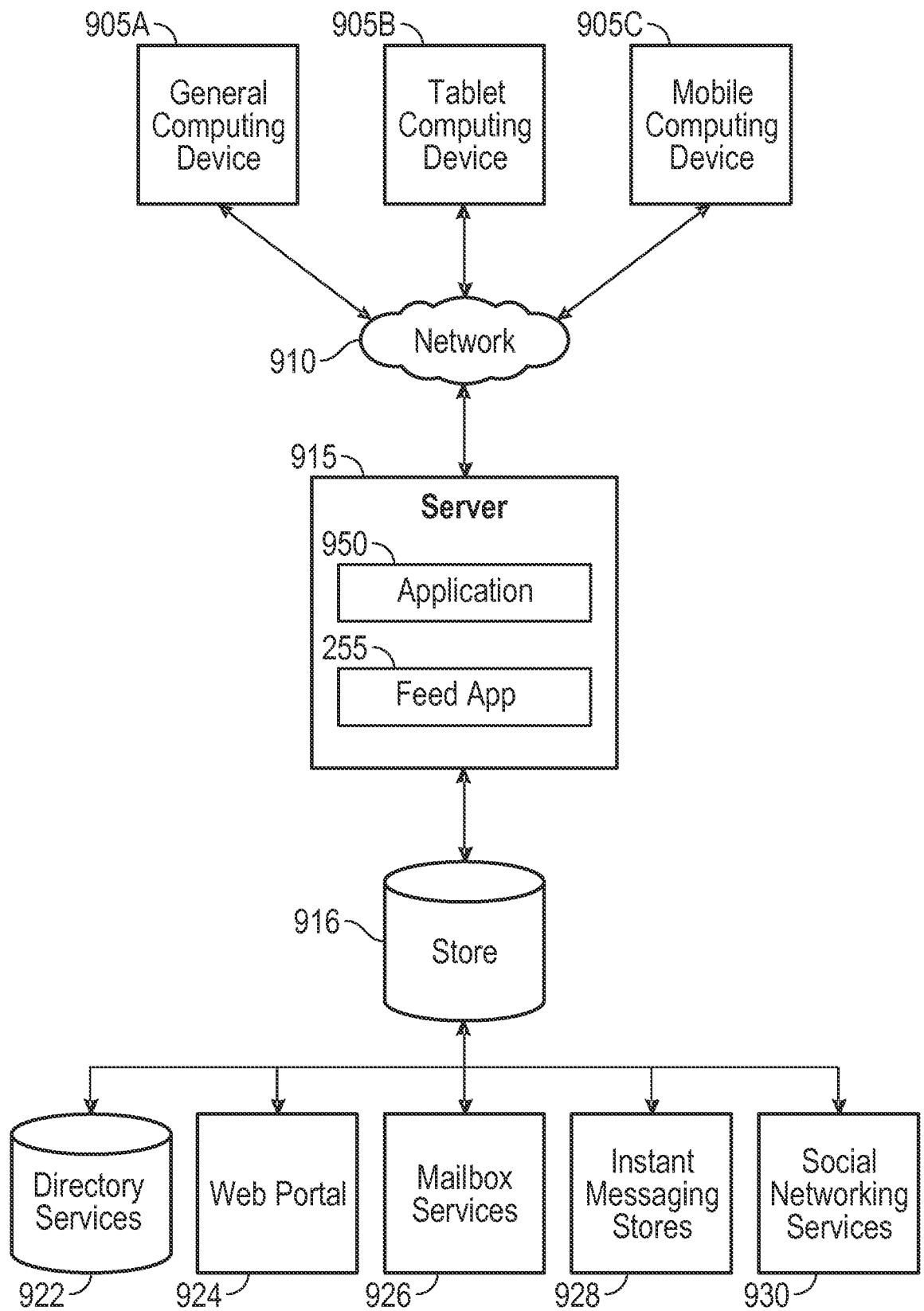
FIG. 9 is a simplified block diagram of a distributed computing system in which embodiments of the invention may be practiced.

FIGS. 7-9 and the associated descriptions provide a discussion of a variety of operating environments in which embodiments of the invention may be practiced. However, the devices and systems illustrated and discussed with respect to FIGS. 7-9 are for purposes of example and illustration and are not limiting of a vast number of computing device configurations that may be utilized for practicing embodiments of the invention, described herein.

FIG. 7 is a block diagram illustrating physical components (i.e., hardware) of a computing device 700 with which embodiments of the invention may be practiced. The computing device components described below may be suitable for the client device 118 described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running software applications 750 such as the Feed Application 255 or client application 120. The operating system 705, for example, may be suitable for controlling the operation of the computing device 700. Furthermore, embodiments of the invention may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 may perform processes including, but not limited to, one or more of the stages of the method 600 illustrated in FIG. 6. Other program modules that may be used in accordance with embodiments of the present invention and may include applications such as electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to providing an activity stream across multiple workloads may be operated via application-specific logic integrated with other components of the computing device 700 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 700 may also have one or more input device(s) 712 such as a keyboard, a mouse, a pen, a sound input device, a touch input device, etc. The output device(s) 714 such as a display, speakers, a printer, etc. may also be included. The aforementioned devices are examples and others may be used. The computing device 700 may include one or more communication connections 716 allowing communications with other computing devices 718. Examples of suitable communication connections 716 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 8A and 8B illustrate a mobile computing device 800, for example, a mobile telephone, a smart phone, a tablet personal computer, a laptop computer, and the like, with which embodiments of the invention may be practiced. With reference to FIG. 8A, one embodiment of a mobile computing device 800 for implementing the embodiments is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative embodiments, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some embodiments, the mobile computing device 800 incorporates a vibration transducer for providing the user with tactile feedback. In yet another embodiment, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one embodiment of a mobile computing device. That is, the mobile computing device 800 can incorporate a system (i.e., an architecture) 802 to implement some embodiments. In one embodiment, the system 802 is implemented as a "smart phone" capable of running one or more applications (e.g., browser, e-mail, calendaring, contact managers, messaging clients, games, and media clients/players). In some embodiments, the system 802 is integrated as a computing device, such as an integrated personal digital assistant (PDA) and wireless phone.

One or more application programs 850 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 150 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800.

The system 802 has a power supply 870, which may be implemented as one or more batteries. The power supply 870 might further include an external power source, such as an AC adapter or a powered docking cradle that supplements or recharges the batteries.

The system 802 may also include a radio 872 that performs the function of transmitting and receiving radio frequency communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs 150 via the operating system 864, and vice versa.

The visual indicator 820 may be used to provide visual notifications and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present invention, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

FIG. 9 illustrates one embodiment of the architecture of a system for providing an activity stream across multiple workloads, as described above. Content developed, interacted with, or edited in association with the feed system 200 may be stored in different communication channels or other storage types. For example, various documents may be stored using a directory service 922, a web portal 924, a mailbox service 926, an instant messaging store 928, or a social networking site 930. The feed application 255 may use any of these types of systems or the like for providing a user information feed 105, as described herein. A server 130 may provide the application 120 to clients 125. As one example, the server 130 may be a web server providing the application 120 over the web. The server 130 may provide the application 120 over the web to clients 125 through a network 140. By way of example, the client computing device 125 may be implemented and embodied in a personal computer 905A, a tablet computing device 905B and/or a mobile computing device 905C (e.g., a smart phone), or other computing device. Any of these embodiments of the client computing device may obtain content from the store 916.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

We claim:

1. A method of generating a user information feed, comprising:
   receiving a first group of documents from one or more information sources;
   generating initial scores for the documents in the first group based on an interest of a user in the documents;
   generating a first instance of the user information feed that comprises the first group of documents arranged in a first order based on the initial scores for the documents in the first group;
   displaying the first instance of the user information feed in response to detecting access by the user;
   receiving a second group of documents from the one or more information sources;
   generating initial scores for the documents in the second group based on the interest of the user;
   updating the initial score for one or more of the documents in the first group to a subsequent score based on the interest of the user, wherein the update is inconsistent with a basis for the arrangement of the first group of documents in the first order;
   maintaining the arrangement of the first group of documents in the first order, regardless of the update of the initial score to the subsequent score being inconsistent with the basis for the arrangement of the first group of documents in the first order;
   arranging the second group of documents in a second order based on the initial scores for the documents in the second group;
   generating a second instance of the user information feed that comprises two or more of the first group of documents arranged in the first order and the second group of documents arranged in the second order; and
   displaying the second instance of the user information feed in response to detecting a next access by the user.

2. The method of claim 1, wherein upon detecting the next access by the user, the displaying is performed by displaying the second instance of the user information feed in an information feed user interface.

3. The method of claim 1, further comprising:
   adding the second group of documents to the two or more of the first group of documents to generate the second instance of the user information feed in response to detecting the next access.

4. The method of claim 1, wherein the second group of documents are displayed as a score-ordered grouping in the second instance of the user information feed adjacent to the two or more of the first group of documents, and wherein, upon each subsequent access by the user, newly added documents are grouped together in score order relative to previous score-ordered groupings of documents.

5. The method of claim 1, further comprising allowing a manual removal of a given document from the second instance of the user information feed.

6. The method of claim 1, further comprising, prior to the next access by the user,
   designating the second group of documents that will be added to the second instance of the user information feed as future documents; and
   allowing modification of the future documents until the next access by the user.

7. The method of claim 1, further comprising determining the interest of the user in a given one of the documents based on one or more of:
   a viewing history of the given document by another user associated with the user for which the second instance of the user information feed is generated;
   a determination that the given document was generated by the user for which the second instance of the user information feed is generated;
   a determination that the given document was communicated to the user for which the second instance of the user information feed is generated;
   a determination that the given document is associated with a topic relevant to the user for which the second instance of the user information feed is generated; and
   one or more comments applied to the given document by another user associated with the user for which the second instance of the user information feed is generated.

8. The method of claim 1, further comprising, prior to generating the second instance of the user information feed, generating a feed graph comprised of the first group of documents and the second group of documents, and storing the feed graph in a graph index.

9. The method of claim 8, further comprising:
   upon detecting the next access by the user, retrieving the feed graph from the graph index for generating the second instance of the user information feed.

10. The method of claim 9, wherein the generated second instance of the user information feed is accessed from one or more access points operative to retrieve the feed graph and to generate and display the second instance of the user information feed.

11. The method of claim 1, further comprising:
    updating the initial score for at least one of the documents in the second group to a subsequent score before generating the second instance of the user information feed, wherein the update is inconsistent with a basis for the arrangement of the second group of documents in the second order;
    re-arranging the second group of documents in a new order based on the subsequent score; and generating the second instance of the user information feed that comprises the two or more of the first group of documents arranged in the first order and the second group of documents arranged in the new order.

12. A method of generating a user information feed, comprising:
receiving a first group of documents from one or more information sources;
generating initial rankings for the documents in the first group based on an interest of a user in the documents;
generating a first instance of the user information feed that includes the first group of documents arranged in a first order based on the initial rankings for the documents in the first group;
displaying the first instance of the user information feed in response to detecting access by the user;
receiving a second group of documents from the one or more information sources;
generating initial rankings for the documents in the second group based on the interest of the user;
updating the initial ranking for one or more of the documents in the first group to a subsequent ranking based on the interest of the user, wherein the update is inconsistent with a basis for the arrangement of the first group of documents in the first order;
maintaining the arrangement of the first group of documents in the first order, regardless of the update of the initial ranking to the subsequent ranking being inconsistent with the basis for the arrangement of the first group of documents in the first order;
arranging the second group of documents in a second order based on the initial rankings for the documents in the second group;
generating a second instance of the user information feed that comprises two or more of the first group of documents arranged in the first order and the second group of documents arranged in the second order; and
displaying the second instance of the user information feed in response to detecting a next access by the user.

13. The method of claim 12, further comprising maintaining the arrangement of at least one of the first group of documents in the first order or the second group of documents in the second order in a third instance of the user information feed, regardless of subsequent rankings generated for the first group of documents and the second group of documents upon receiving a third group of documents that are added to the third instance of the user information feed.

14. The method of claim 13, further comprising:
detecting a further access by the user;
adding the third group of documents to the third instance of the user information feed; and
displaying in the third instance of the user information feed the third group of documents in order of initial rankings applied to the third group of documents, wherein the third group of documents are displayed as a rank-ordered grouping in the third instance of the user information feed such that, upon each subsequent access by the user, new documents are grouped together in rank order relative to previous rank-ordered groupings of documents.

15. The method of claim 12, further comprising:
allowing a manual removal of a given document from the first or second instance of the user information feed.

16. The method of claim 12, wherein generating the second instance of the user information feed includes populating the second instance of the user information feed with a top X number of the documents.

17. A system for generating a user information feed, comprising:
a processing unit;
a memory including computer executable instructions, which when executed by the processing unit, cause the processing unit to:
retrieve a first group of documents from one or more information sources;
generate initial scores for the documents in the first group based on an interest of a given user in the documents;
generate a first instance of the user information feed that comprises the first group of documents arranged in a first order based on the initial scores for the documents in the first group;
display the first instance of the user information feed in response to detecting access by the given user;
receive a second group of documents from the one or more information sources;
generate initial scores for the documents in the second group based on the interest of the given user;
update the initial scores for particular documents from among the first group of documents to subsequent scores based on the interest of the given user, wherein the update is inconsistent with a basis for the arrangement of the first group of documents in the first order;
maintain the arrangement of the first group of documents in the first order, regardless of the update of the initial scores to the subsequent scores being inconsistent with the basis for the arrangement of the first group of documents in the first order;
arrange the second group of documents in a second order based on the initial scores for the documents in the second group;
generate a second instance of the user information feed that comprises two or more of the first group of documents arranged in the first order and the second group of documents arranged in the second order; and
display the second instance of the user information feed to the given user in a user information feed user interface in response to detecting a next access by the given user.

18. The system of claim 17, wherein the initial scores of the first group of documents displayed in the first instance of the user information feed meet a score threshold.

19. The system of claim 17, wherein the initial scores of the second group of documents and one or more of the initial score or the subsequent score of the two or more of the first group of documents displayed in the second instance of the user information feed meet a score threshold.

20. The system of claim 17, wherein a number of the two or more of the first group of documents displayed in the second instance of the user information feed is determined based on a total number of documents to be displayed in the second instance of the user information feed and a number of documents in the second group.

* * * * *